(12) United States Patent
Durance et al.

(10) Patent No.: US 8,877,469 B2
(45) Date of Patent: Nov. 4, 2014

(54) METHOD OF DRYING BIOLOGICAL MATERIAL

(75) Inventors: Timothy D. Durance, Vancouver (CA); Parastoo Yaghmaee, Vancouver (CA); Shafique Ahmad, Surrey (CA); Guopeng Zhang, Langley (CA)

(73) Assignee: Enwave Corporation, Vancouver, British Columbia (CA)

( * ) Notice: Subject to any disclaimer, the term of this patent is extended or adjusted under 35 U.S.C. 154(b) by 901 days.

(21) Appl. No.: 11/701,096

(22) Filed: Feb. 1, 2007

(65) Prior Publication Data

US 2008/0050793 A1 Feb. 28, 2008

Related U.S. Application Data

(63) Continuation-in-part of application No. 11/630,305, filed as application No. PCT/CA2005/001192 on Jul. 29, 2005, now Pat. No. 8,722,749.

(60) Provisional application No. 60/592,138, filed on Jul. 30, 2004.

(51) Int. Cl.
*C12N 13/00* (2006.01)
*F26B 5/04* (2006.01)
*C08J 9/28* (2006.01)
*F26B 5/06* (2006.01)

(52) U.S. Cl.
CPC . *C08J 9/28* (2013.01); *F26B 5/048* (2013.01); *C08J 2301/00* (2013.01); *F26B 5/06* (2013.01); *C08J 2201/0504* (2013.01); *C08J 2201/0484* (2013.01)
USPC ............. 435/173.1; 34/259; 34/263; 219/694

(58) Field of Classification Search
None
See application file for complete search history.

(56) References Cited

U.S. PATENT DOCUMENTS

| | | | | |
|---|---|---|---|---|
| 4,292,972 | A | 10/1981 | Pawelchak et al. | |
| 5,075,344 | A | 12/1991 | Johnson | 521/140 |
| 5,360,828 | A | 11/1994 | Morrison | |
| 5,766,520 | A * | 6/1998 | Bronshtein | 264/4.6 |
| 5,961,872 | A * | 10/1999 | Simon et al. | 219/729 |
| 6,335,040 | B1 * | 1/2002 | Hoier et al. | 426/34 |
| 6,589,328 | B1 | 7/2003 | Nussinovitch | |
| 2002/0094434 | A1 | 7/2002 | Zhou et al. | |
| 2002/0127276 | A1 | 9/2002 | Neurath et al. | |
| 2002/0174562 | A1 | 11/2002 | Pearcy et al. | 34/284 |
| 2003/0219475 | A1 * | 11/2003 | Truong-Le | 424/450 |
| 2006/0073188 | A1 | 4/2006 | Goutay et al. | |

FOREIGN PATENT DOCUMENTS

| | | |
|---|---|---|
| CA | 1221743 | 5/1987 |
| CA | 1248348 | 1/1989 |
| CA | 2189961 | 9/2000 |
| CN | 1456349 A | 11/2003 |
| CN | 1732214 A | 2/2006 |
| DE | 197 12 708 A1 | 3/1997 |
| WO | 03087327 A2 | 10/2003 |
| WO | WO 2004/090027 | 10/2004 |
| WO | WO 2006/010273 A1 | 2/2006 |

OTHER PUBLICATIONS

Kim, SS et al. Survival of lactic acid bacteria during microwave vacuum-drying of plain yoghurt. Lebensmittel-Wissenschaft und-Technologie. 1997. 30(6): 573-577.*
Kok, LP et al. Ultrarapid vacuum-microwave histoprocessing. Histochemical Journal. 1995. 27: 411-419.*
Nussinovitch, A et al. Alginate-oil sponges. Food Hydrocolloids. 1997. 11(3): 281-286.*
Gunasekaran et al., "Effect of Experimental Parameters on Temperature Distribution during Continuous and Pulsed Microwave Heating", J Food Eng 78:1452-1456 (2007).
Labotron Technical Specifications; Laboratory Microwave Oven—Testbourne Ltd.; http://www.testbourne.com/instruments/sairem-products/7298/Laboratory-Microwave-Oven/, Apr. 26, 2010. 2 pages.
A.C. Metaxas et al., "Industrial Microwave Heating—Ch. 5—Travelling wave applicators and Ch. 6—Multimode oven applicators", Peter Peregrinud Ltd., London, UK (1983).
Notice of Allowance of corresponding Canadian Patent Application No. 2,673,589 dated May 14, 2010.
Allowed claims 1-20 of Canadian Patent Application No. 2,673,589, 3 pages.
Supplementary European Search Report for corresponding Application No. EP 05 77 2090 (Mar. 9, 2011).
Wongsuban et al., "The Effect of Electron Beam Irradiation on Preparation of Sago Starch/Polyvinyl Alcohol Forms", Nuclear Instruments and Methods in Physics Research B211, Oct. 2003. 211(2): 244-250.

* cited by examiner

*Primary Examiner* — Allison Fox
*Assistant Examiner* — Susan E Fernandez
(74) *Attorney, Agent, or Firm* — Porzio, Bromberg & Newman, P.C.

(57) ABSTRACT

A method for producing foams containing biological materials is described. A solid or semi-solid paste is formed by combining biologically active material with a protecting agent in an aqueous solvent. The paste formed is allowed to set, and may optionally then be apportioned into the desired shape. The paste may be frozen to allow formation of ice crystals to act as porogens. Subsequently, the paste is exposed to travelling wave radiant energy under vacuum (t-REV) for drying. This causes the solvent to boil off, leaving dried material containing the biologically active material, the protecting agent, and a relatively low water content. Biologically active materials which can be used include cells, microbial cultures, live attenuated microbes, probiotics, yeasts, enzymes, vaccines, proteins, and any heat-sensitive biological material. By directing energy via a travelling wave through a sample, good control of temperature and process conditions can be achieved. The method provides an alternative to the conventional methods of particulate leaching or freeze drying.

17 Claims, 26 Drawing Sheets

FIG. 27
PRIOR ART
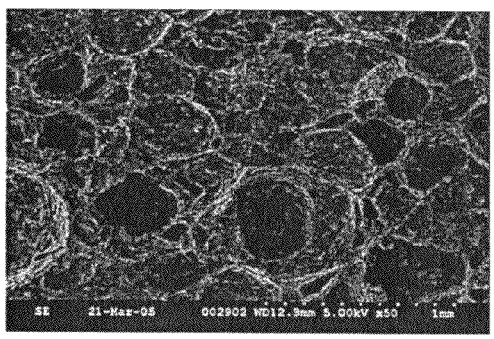
FIG. 28
PRIOR ART
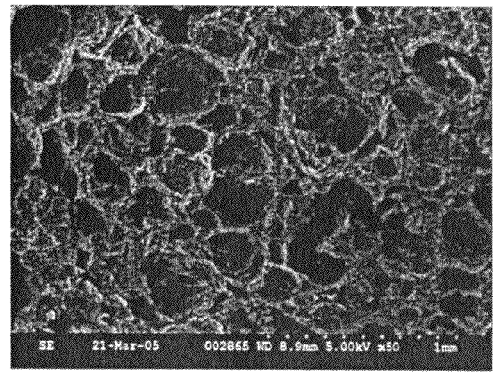
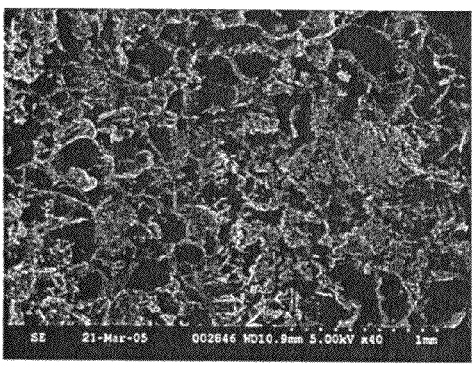
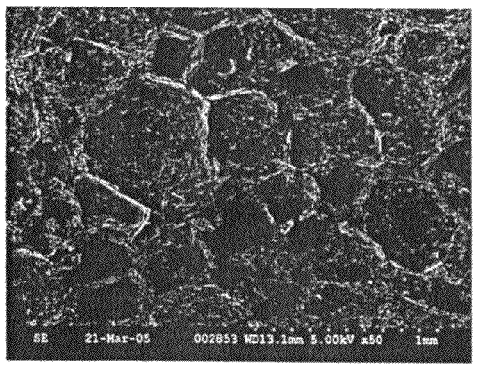
FIG. 29
PRIOR ART
FIG. 30

METHOD OF DRYING BIOLOGICAL MATERIAL

CROSS REFERENCE TO RELATED APPLICATIONS

This is a Continuation-In-Part of U.S. patent application Ser. No. 11/630,305 filed Sep. 20, 2007, now U.S. Pat. No. 8,722,749, which is the national phase of PCT/CA2005/001192 filed Jul. 29, 2005. This application claims priority to U.S. Provisional Patent Application No. 60/592,138 filed Jul. 30, 2004, International Application PCT/CA2005/001192, filed Jul. 30, 2004, and U.S. patent application Ser. No. 11/630,305, each of which is incorporated herein by reference.

FIELD OF THE INVENTION

The invention pertains to a method for producing dry foams, such as sponges, from hydrocolloids.

BACKGROUND OF THE INVENTION

Methods for producing sponges of gelatin, collagens, fibrin, poly (glycolic acid) (PGA) and poly(lactic acid) (PLA), etc. have been known for some time. While many techniques exist for producing foams for biomaterial applications, however, most involve the use of organic solvents and some are prohibitively expensive to employ. One common technique is solvent casting followed by particulate leaching. The polymer is first dissolved in organic solvent, and then it is mixed with a solid "porogen" such as table salt. The solvent is evaporated, leaving the salt crystals cast in the polymer. Next, the composite is leached with water to remove the salt, leaving the porous material. Another common class of techniques is phase separation/emulsification. A foam may be produced containing polymer dissolved in organic solvent then beat into a foam with water. The foam is then frozen and freeze-dried to remove the solvent and water. Techniques based on freeze drying are not well suited to large scale operations. Freeze drying is a very expensive method of removing water, due to the expensive equipment required, the slow rate of dehydration and high energy consumption.

Conventional methods of drying to produce a foam include air drying, freeze drying, and vacuum drying. Air drying produces pores in a solid or semi-solid material by incorporating a leaving agent, pore-casting, or salt elution. Often this process takes a long time, or is expedited by application of heat. Freeze drying takes a considerable amount of time, and is limited by the space available in the apparatus. It is also expensive due to the equipment required and the energy consumed to effect sublimation. Vacuum drying does not allow control of energy input rate, and thus it is difficult to control pore size or pore wall thickness in the resulting foam.

Cellular solids can also be produced from gels. Gels are widely used in the food industries, and diffusion of solutes into foods is common practice (Rassis et al., 1997). Recently, dried gels have been proposed to serve as carriers for food ingredients such as vitamins and minerals and also drugs after surgery or treatments. Hydrocolloid gels can be derived from polysaccharides, yielding fine textured gels at low polymer concentration, or from proteins using higher polymer concentrations. The production of dried hydrocolloid gels is simple, quick and inexpensive. Control of their physical properties in terms of porosity and mechanical strength would enable their use for a wider range of purposes. They can also be used to control the acoustic response of specific dry food products and have a great potential for future use in countless different fields, from foods and packaging to medicine and medical care, daily commodities, farming and agriculture and the environmental chemical and even electronic industries.

Hydrocolloid gels have a network structure that swells in an appropriate solvent. Swelling of a gel involves an increase of a network pressure that results from elastic extension of the polymeric matrix. When this network pressure becomes relaxed by means of dehydration, shrinkage may take place. During dehydration, the hydrophilic polymer matrix is surrounded by water before drying, and air after drying. These phases may be considered as good and poor solvents, respectively. A poor solvent may favor polymer-polymer interaction, and thus may induce a spontaneous collapse. The collapse is induced by the change in solvent quality during dehydration. Capillary forces have also been considered as one of the reasons for collapse. The end point of the shrinkage or collapse may be the transition from the rubbery to the glassy state of the product. The hydrocolloid gel physics indicates that a drastic increase in rigidity is possible by percolation of filler particulates (Eichler et al., 1997).

When two polymers in the form of macroscopic particles are mixing together, there is a chance of phase separation of the polymeric blend in the dried material. This kind of separation depends on various parameters like individual solubility of the polymers in the solvent used, interaction with substrate surface, method of deposition and method of drying. To avoid these problems, nano-particles of polymers are combined and dried (see Kietzke et al., 2003). They demonstrated that aqueous dispersions containing nano-particles of various polymers could be produced by a "miniemulsion" process. They dissolved the polymers first in suitable solvent then added it to an aqueous solution containing an appropriate surfactant. By applying high shear, a stable emulsion containing small droplets of polymer solution (the so-called miniemulsion) is obtained.

Hydrocolloid foams and sponges can be produced by freeze dehydration either immediately after their production or after their immersion in different carbohydrate solutions to change their physical and chemical compositions. The resultant dried cellular structures are an interconnected network of pores in a solid structure. Varying the preparation procedures can modify the mechanical properties of these sponges. For example, internal gas bubbles in wet agar gels drastically reduced the mechanical integrity of the dried sponges and affected their porosity. However, the same process in alginate sponges caused only minor mechanical changes (Nussinovitch et al., 1993). Oil included in alginate gels weakens the mechanical strength of the dried sponges, lowers its stress and stiffness at failure as reflected by the deformability modulus, and changes the size distribution and structure of pores of the dried sponges (Nussinovitch and Gershon, 1997). Water plasticization of sponges changes their stress-strain behavior. Vacuum dried gels or those conditioned to water activity 0.33 collapsed by brittle fracture. Sponges conditioned to water activity 0.57 and 0.75 appeared to collapse by elastic buckling (Rassis et al., 1998).

Most gels have a low solid content and have therefore rather low total solids for efficient drying. Hydrocolloid foams and sponges are dry gel products that may be economically feasible, depending on the cost of the drying process involved.

Cellular solids have a low density and low mechanical strength based on the cell wall and the entire cellular structure. Their structure can be classified according to the following characteristics. Flexibility vs. brittleness of cell wall; distribution of cell size in the body of the cellular solid; open vs. closed cells; thickness and shape of the cell wall; and structure uniformity as mentioned on different length scale. The most valued properties of cellular solids are their density, conductivity, Young's modulus, and strength. Cellular solids usually have relative densities of less than 0.3 kg/m$^3$, but they may reach a lower value. Different structures of cellular solids lead to a wide range of such properties and a much greater utility. A low density substance translates to light, stiff, large portable structures that are able to float. Their low thermal conductivity brings about thermal insulation.

There is a need in the art for new and improved methods of producing foams and sponges from hydrocolloids. Further, there is a need for methods of drying biologically active material which allow good control of temperature during the drying process for materials which may be heat labile or heat sensitive.

SUMMARY OF THE INVENTION

The present invention provides a method for drying a biologically active material. The method involves combining a biologically active material with a protecting agent in an aqueous solution, forming a paste, and exposing the paste to travelling wave radiant energy under vacuum. By directing radiant energy in a generally unidirectional manner under vacuum, the method allows close regulation of temperature of the samples during drying.

The invention provides a method for drying a biologically active material comprising the steps of: combining the biologically active material and a protecting agent in an aqueous solvent to form a paste; and exposing the paste to travelling wave radiant energy under vacuum to boil the solvent from the paste.

The resulting dried biologically active material takes on the appearance of a foam or sponge and may be used as is for re-hydration, or may be ground into smaller portions and distributed into other products. The method advantageously allows drying of heat sensitive or heat labile biological ingredients such as microorganisms (bacterial culture, live attenuated microbes, probiotics, yeasts, etc.), enzymes, or drugs such as vaccines and antibiotics. Other uses, which may be commonly applicable to foams and sponges would also be possible uses of the dried biologically active material formed according to the invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 27 is an SEM view of an air-dried sponge formed according to PRIOR ART methods.

FIG. 28 is an SEM view of a vacuum dried sponge formed according to PRIOR ART methods.

FIG. 29 is an SEM view of a freeze dried sponge formed according to PRIOR ART methods.

FIG. 30 is an SEM view of a sponge formed according to the invention.

DETAILED DESCRIPTION

Figure 1A:
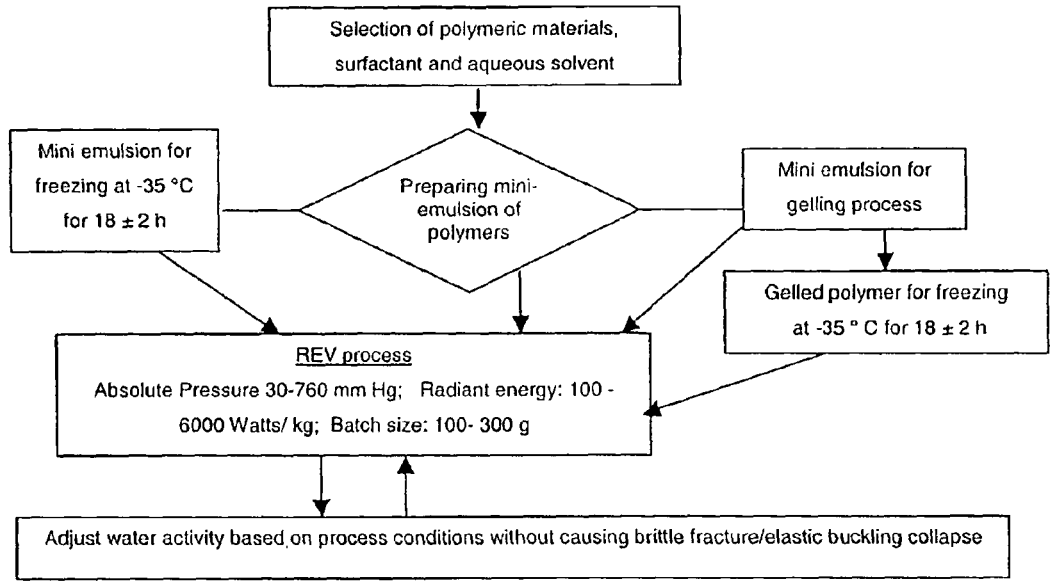
FIG. 1A is a flow chart showing a specific process for preparation of hydrocolloid gel cellular sponges according to an embodiment of the invention.

The present invention provides for methods for producing solid, dry foams and sponges from hydrocolloids.

As used herein, the term foam refers to a matrix having interconnected open cells or pores formed therein, and may be any such product of either a rigid or pliable type. The term sponge is used herein to refer to a type of foam that is flexible and may possess absorbency to some extent. A sponge may be considered as a foam that contains a certain moisture content that allows the foam to be soft and somewhat pliable. A variety of foam types, including sponges, may be formed according to the invention.

By the term radiant energy as used herein, it is meant electromagnetic energy that is capable of penetration of the gel material. This may be further defined according to wavelength, for example, in the microwave or radiofrequency range, which entails wavelengths between 1 cm and 10 meters.

By the term REV™ it is meant radiant energy under vacuum.

By the term t-REV™ it is meant travelling wave radiant energy under vacuum. A travelling wave eminating from a source, passing through a sample in a directional manner, without significant reflections and deflections of the waves around or through a sample. This may be accomplished by directing radiant energy from a source in a generally unidirectional manner through a sample. A wave guide may be used to direct radiant energy in this way. Energy may be quenched or otherwise dispersed after passing through a sample so as to prevent significant deflection or reflection back through the sample. An exemplary manner of quenching radiant energy is by placement of a water load at the end of the waveguide to absorb energy.

The terms cells and pores as used herein are meant interchangeably to denote the air spaces within the puffed foam structure.

The terms "paste" or "gel" as used herein means any solid or semi-solid material which may or may not have a gelled consistency. A paste or gel may comprise components contributing to a thickness that is greater than a liquid. A paste or gel may comprise a hydrocolloid polymeric material in an aqueous solvent. Optionally, other ingredients may be included in a paste or gel, such as active ingredients. As a semi-solid, the paste or gel may be somewhat pliable or runny, so long as a desired shape or containment can be achieved when the paste or gel is exposed to radiant energy under vacuum.

Embodiments of the invention provide a method for protection by dehydration of biomaterials in pure form or mixed with protective agents. The method can be used for various applications including for drying pure cultures, live attenuated microbes, probiotics for food additives, supplements, enzymes, vaccines, medicinal carrier or fortified animal feed.

Embodiments of the method involve preparing a paste of biomaterial with a solid concentration of about 15% or more as a pure material, or with a solid concentration of about 10% or more of biomaterial along with a biodegradable material as a protecting matrix, followed by exposure of the paste to radiant energy under vacuum (REV).

The radiant energy under vacuum is preferably conducted using travelling wave radiant energy. This may be induced using any means capable of directing radiant energy in a specified direction through a sample, via a wave guide, and thus minimizing significant deflection and/or reflection of energy, and ultimately directing waves into a water reservoir. A typical device for inducing such travelling wave radiant energy is the radiant energy vacuum device Model VMD 900W of Enwave Corporation of Vancouver, Canada.

Following exposure to radiant energy under vacuum, the dried material may then be milled to suitable particle size for inclusion in other products. The dry processed product contains the bioactive compound either alone or embedded in a continuous matrix of inert material, when a protecting matrix is employed. The heat stability of REV embedded bioactive materials will be influenced by interactions with matrix materials. Heat stability and storage stability may be increased in the dried product. By selection of matrix materials of greater or lesser solubility, the release rate of the bioactive material from the matrix can be controlled. The invention allows custom design of a suitable carrier matrix for a specific biomaterial matching its practical application.

The combination of vacuum and microwave energy, herein referred to as radiant energy under vacuum or REV, can provide a rapid and efficient drying method that yielding products with unique characteristics while retaining biological functions. Drying can occur with minimal damage compared with conventional drying methods. Electromagnetic waves penetrate the biomaterial and convert to thermal energy, providing even and rapid heating.

Vacuum (that is pressure of less than standard atmospheric pressure of 760 Torr absolute pressure) lowers the boiling point of water to less than 100° C. and creates a pressure gradient that increases the rates of mass and heat transfer. In situ vaporization of water provides an expansive force to maintain an open and porous structure in the product being dried, which further enhances the drying rate.

The temperature can be kept at low levels during the process and drying occurs quickly at low oxygen pressure. This minimizes damage to biological activities of the materials being dried. Vacuum microwave dehydration has been shown in numerous reports to allow dehydration of tissue-foods from plants with excellent retention of flavors, vitamins, etc.

Durance et al. describe a REV technique for formation of dry porous materials from gels or solutions of hydrocolloids such as starch, methyl cellulose, pectin, etc. (see PCT/CA2005/001192, published as WO/2006/010273). This method teaches REV within a resonance chamber design of a vacuum microwave dehydrator, which directs microwave energy into a vacuum chamber that serves as a resonance cavity for microwaves. A resonance cavity is a metal chamber of sufficiently large dimensions that microwaves are able to reflect off the walls and form multimode standing wave patterns. In this design, microwaves directed into the cavity are reflected by the metal chamber walls to pass through the material being processed multiple times until they are finally absorbed. This can be an energy efficient design because most of the microwave energy will eventually be absorbed by the material to be dehydrated.

According to the instant invention, by using a travelling wave model of inducing radiant energy under vacuum into the sample to be dried, more control of temperature can be realized. When waves are reflected within a resonance chamber, as the material dries, the total microwave power output of the apparatus must be absorbed by less and less water and material in the sample, and may be referred to as "thermal runaway". Use of a resonance cavity requires that the mass of the load of material to be processed be matched with the input microwave power of the apparatus. Quantities of material that are small relative to the microwave power of the apparatus may reach high temperatures when drying because of the abundance of microwave power absorbed by the material. An alternative is the travelling wave REV process of the instant invention, based on the travelling wave principle described by Metaxas and Meredith (1983) in Industrial Microwave Heating, Peregrinus Ltd, London.

In a travelling wave microwave applicator, the material to be heated is placed not in a resonance cavity but rather in a waveguide and microwaves are directed into the wave guide from one end. The waveguide is preferably of suitable dimensions such that microwaves propagate from one end to the other of the waveguide and do not tend to reflect from side to side of the wave guide. At the end of the waveguide away from the microwave source, a water load is attached that absorbs any microwave energy that is not absorbed by the material in the waveguide. Microwaves thus only pass through the material once and if they are not absorbed in that pass, they continue down the waveguide and are absorbed by the water load.

By introducing a vacuum chamber into the travelling wave waveguide, materials can be process materials under REV conditions with excellent control of temperature. This has the advantage of allowing cells, cultures and other heat-sensitive materials to be processed under tightly regulated temperatures, avoiding structural damage in the processing. The travelling wave radiant energy under vacuum process may be referred to interchangeably herein as t-REV. The t-REV processes allow excellent control of temperature for retention of biological activity, by applying uniform microwave exposure to a sample, and results in a uniform product. Very small quantities of material can be t-REV processed without overheating because thermal runaway is minimal.

Pure microorganisms cultures, live attenuated microbes, probiotics & vaccines may be dried according to the invention. Freeze drying or lyophilization is the most common method in preparations of dry, viable bacterial cultures and other microorganisms. Although it allows higher survival of microorganisms (i.e. viability) compared to spray drying or other air-drying methods, freeze drying requires long process times and costly equipment. In addition freezing and thawing processes are associated with some loss of viability. Studies have shown freeze-drying had a deleterious effect on the viability of all probiotic organisms. Probiotics are dietary supplements containing potentially beneficial bacteria or yeast. Probiotic bacterial cultures are intended to assist the body's naturally occurring flora within the digestive tract to re-establish themselves and fight off pathogens.

Vaccines are suspensions of attenuated or killed microorganisms, or immunogenically active components of microorganisms, that are administered for the prevention, amelioration or treatment of infectious diseases. Vaccines illicit an immune response from the host body similar to that of the active pathogen but without disease symptoms, thus preparing the body to rapidly combat the real pathogen when and if it should invade the body. Although traditionally vaccines have been distributed in liquid form, many dry vaccine preparations are now being produced and developed. Dry vaccines are expected to allow savings in storage, distribution as well as more convenient and safe administration to patients. Freeze-drying is the most common means of dehydration of vaccines. Practical viability levels of dry vaccines are similar to those of other dry preparations of microorganisms with losses of viability of 0.5 $\log_{10}$ or greater being typical.

In examples provided herein probiotic bacteria were chosen as representative bioactive materials and skim milk powder, lactose, trehalose and honey as protecting matrix materials.

If it is desired to form a sponge or foam, the general steps for preparation of sponges or foams from hydrocolloids are outlined herein. The formation of an aqueous gel is followed by exposure of the gel to a radiant energy field under vacuum at a sufficient level to cause the solvent to boil, thereby forming a foam. Each step is discussed in further detail below.

In the first step, a solid or semi-solid aqueous gel is formed by dissolving one or more suitable polymeric materials in an aqueous solvent. Polymeric materials suitable for production of hydrocolloid sponges are those capable of hydrocolloidal formation in an aqueous solution, which capacity can easily be determined by those of skill in the art. Such polymeric materials are herein referred to interchangeably as hydrocolloid polymeric materials. Such materials may also be used as protecting agents to protect biologically active materials dried according to the invention.

Exemplary protecting agents and/or hydrocolloidal polymeric materials include, but are not limited to, cellulose acetate phthalate (CAP), carboxy-methyl-cellulose, pectin (both low and high methoxy pectin), sodium alginate, glycerol, hydroxyl propyl methyl cellulose (HPMC), methyl cellulose, carrageenan, gum acacia, xanthan gum, locust bean gum, isolated soya protein, chitosan, maltodextrin, collagen, salts of alginic acid, polyglycolic acid, starches such as tapioca starch, corn starch, potato starch, and gelatin. Protecting agents need not be hydrocolloidal polymeric materials, for example, skim milk powder, and sugars such as lactose, trehalose or honey may also be used.

The solvent in which the protecting agent or polymeric material is dissolved is aqueous, for example, distilled water. However, the solvent may include other fluid components as additives. For example, such additives may be oils such as coconut oil, corn oil, peanut oil, hydrogenated vegetable oil, olive oil, mineral oil, etc. In the case where an oil or other additive is included which may not immediately be soluble in the aqueous solvent, an emulsion or "miniemulsion" can be formed to ensure that the gel ultimately formed is uniform and homogeneous.

A surfactant may optionally be added to the solvent, for example glycerol, propylene glycol, lecithin, Tween-80, Tween-20, or waxes such as white wax, bee's wax, etc. Optimally, the solvent may range from 70% to 95% of the total gel on a wet basis. However, more dilute or concentrated gels may be used for particular applications as desired. Other non-aqueous solvents can be used as long as the boiling point is at a temperature that would not destroy the biological activity of the components of the foam. A boiling point of less than 70° C., and preferably less than 37° C. would be possible. However, the advantage of using aqueous solvent without the necessity to employ harsh organic solvents is realized when water is used as the solvent.

In the case where a sponge or foam is formed using a hydrocolloid polymeric material, an active ingredient may optionally be added to the solvent at any point in order to incorporate the active material uniformly into the foam matrix, once formed. Exemplary active materials include cells, cultures, vaccines, enzymes, drugs and other biologically active compounds. For example, microbicides, spermicides, fungicides, antibiotics such as penicillin or fusidic acid, anti-cancer medicaments, cardiac drugs, anti-hypertensives, anti-rejection drugs, insulin, biological proteins, carbohydrates, hormones, such as those hormones which may be employed in birth control applications, nutrients, such as vitamins, minerals or antioxidants. In the case where the invention is used for drying of biologically active materials in combination with protecting agents, but not necessarily with a polymeric material, these biologically active materials can be used without such a polymeric material.

Other components may be added to the paste to create a desired effect. For example, acids and bases may be added, such as citric acid, sodium bicarbonate, and others, so that an acid-base reaction may be realized.

Various combinations of hydrocolloids can be employed according to the invention to develop a wet hydrogel with the desired Young's modulus value. The Young's modulus of the hydrocolloid gel is a factor that can be manipulated according to the inventive method in order to achieve different pore sizes or foam properties. By evaluating this parameter at this stage, the method advantageously allows for manipulation of final properties of the foam formed.

After combining the biologically active material and the protecting agent with the solvent and any optional additives, a paste is formed which may be optionally apportioned, shaped or cut into the desired portion, size or configuration as necessary.

Paste freezing is a further optional step that may be employed prior to exposing the gel to radiant energy under vacuum. If employed, the freezing step can advantageously control or help maintain the gel temperature during drying under radiant energy and vacuum conditions. The large variation in dielectric properties of ice and water help the frozen gel sample to increase in temperature during drying. An unfrozen sample will also increases in temperature during drying, but by freezing the gel, the rate at which temperature increases is affected, and foam properties can be manipulated. Advantageously, freezing the gel prior to foam formation may assist in maintaining a uniform temperature increase. Also in certain gels, the optional freezing step allows for the formation of ice crystals that act as "porogens". Ice crystal size affects the size and number of pores in the final material. Size is controlled by adjusting the freezing rate and freezing temperature of the gel; low temperatures and fast freezing will result in small crystals, while slow freezing at higher temperatures yields larger crystals. A typical freezing regime would be −80° C. for 1 to 3 hours. Of course, variations of this freezing temperature and time would be possible in order to manipulate the desired foam characteristics.

In a second step according to embodiments of the invention the paste is exposed to traveling wave radiant energy under vacuum. The combination of radiant energy exposure and application of a vacuum may be referred to interchangeably as t-REV™ herein. The combined effect of radiant energy and vacuum conditions is applied at a sufficient level to cause the solvent to boil, and the biologically active material becomes dried.

The vacuum applied should optimally be maintained between 0 and 760 mmHg within a vacuum chamber, and an exemplary range would be between 30 and 760 mmHg. A typical value of 10-30 mmHg (or torr) can be accomplished within such a chamber.

The vacuum chamber may be configured so as to allow a continuous feed of gel through the field of radiant energy under vacuum. Batch processing or continuous feed methods may be employed.

A typical initial Young's modulus value for a gel used to form a foam may range from about 0.16 kPa to 3000 kPa. Of course, values outside of this range may be used to achieve desirable properties.

The radiant energy applied is typically between 100 and 5000 Watts, which is typically applied to a kilogram of initial mass, with an exemplary range being from 100 to 2000 Watts. For smaller sized batches, for example, when the batch size is from 1-2 g, energy applied can be adjusted to the lower end of this range, for example, from 100 to 300 Watts. One possible way in which the energy may be applied is through microwave power. A microwave-inducing device capable of directing microwaves in a generally unidirectional manner through a sample can be used according to the invention for inducing travelling wave radiant energy. One such device is the Model # VMD 900 W, available from Enwave Corporation of Vancouver, BC, Canada. Pressure can be controlled within the chamber of such a device to achieve the requisite properties. A typical value of 10-30 mmHg (or torr) can be accomplished within such a chamber.

Typically, the average diameter of a cell formed using the method of the invention may be between 0.003 to 500 micron. Of course, this is an exemplary range, and pore sizes outside of this range can also be achieved if desired.

Typically, the desired level of water activity in the dried biologically active material, foam or sponge resulting from this process is below 0.85, so as to restrict bacterial growth of spore-forming bacteria. Of course, for some applications, a higher water activity may be desirable, and bacterial growth could be prevented in other ways. In some materials, water activity below 0.60 may be desirable, and further, some materials may benefit from a water activity below 0.55 or below 0.30 to achieve the desired chemical stability. Advantageously, the method of the invention allows good control over water activity.

Within a drying chamber, the wet paste or gel may optionally be allowed to maintain constant displacement in order to achieve uniform radiant energy absorption.

Advantageously, the method can be employed when an active ingredient to be incorporated into a gel would be considered too sensitive to dry or incorporate into a foam by other methods that require higher heat. Because travelling wave radiant energy is applied under vacuum, less heat is generated than if the vacuum was not applied, or if the energy was applied without any directional effect. This allows heat sensitive cells, such as microbial cultures, live attenuated microbes, enzymes, yeasts, probiotics or drugs to be dried and/or incorporated into the matrix of the foam without risking their destruction. Very temperature sensitive ingredients that cannot endure temperatures greater than about 20° C. may be employed with caution, provided an appropriate combination of energy and vacuum is applied. Use of metals which may reflect microwave energy are undesirable for use with microwave energy applications.

It is possible to optionally apply other types of heating, for example, water heating, electric heating or convectional heating, to expedite solvent boiling, or to achieve a desired property in the resulting foam. However, an advantage of the instant invention over prior art drying methods is that such conventional methods of solvent boiling are not required, and thus the method is amenable to the incorporation of heat-sensitive compounds or materials.

The dried materials, foams and sponges formed according to this method possess features which are not reproducible using conventional methods of drying. Specifically, the uniformity of the cells created, and the thickness of the cell walls are features attributable to and easily manipulated by the inventive methodology. Pore sizes ranging from 0.003 to 500 microns can be achieved. However, in the prior art, additional pore-forming techniques, separate from the drying step, would need to be employed to create such pores. For example, gas foaming, phase separation, and salt leaching methods can create pores of various sizes when combined with conventional drying methods. It is an advantage of the instant invention that these supplemental pore-forming techniques are not required for pore formation, although they may be optionally employed to accomplish a desired effect.

Figure 1B:
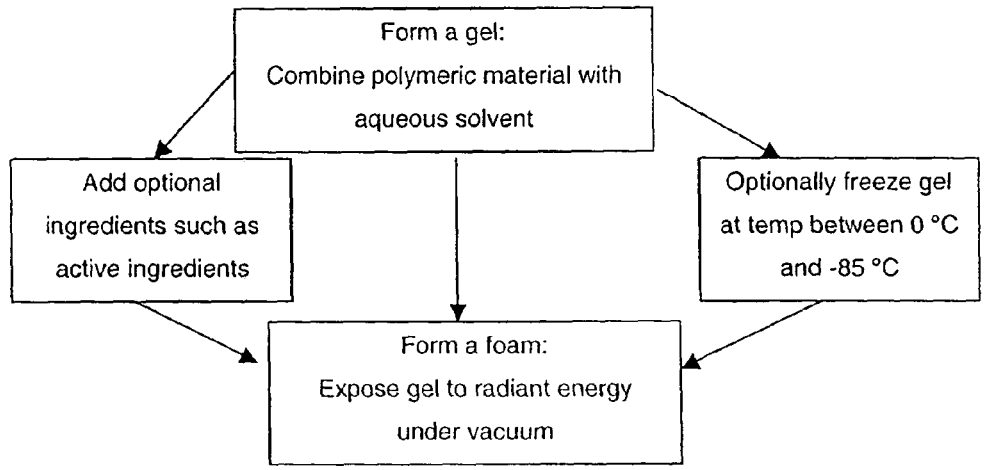
FIG. 1B is a flow chart showing the general process for preparation of a foam according to an embodiment of the invention.

FIG. 1A provides a flow chart illustrating preparation of hydrocolloid gel cellular sponge according to an embodiment of the invention. Briefly, materials are selected. In this case, the polymeric materials, a surfactant and an aqueous solvent are used. A mixture (herein referred to as a "miniemulsion") of the polymeric materials selected is prepared. Optionally, the miniemulsion is frozen at –35° C. for about 18 hours. As a further option, the miniemulsion is processed further in gelling, for example by cutting, molding, or adding in additional additives. As a further option, the gelled miniemulsion may be frozen. Subsequently, the gel is exposed to radiant energy under vacuum, and in this case, exemplary conditions are provided for a batch size of from 100 to 300 g. It is to be understood that the invention can be extended beyond this example to include process conditions out of these ranges. Water activity is adjusted by selecting the appropriate process conditions FIG. 1B provides a flow chart illustrating preparation of a foam according to an embodiment of the invention. Generally, a gel is prepared using the selected polymeric material in an aqueous solvent. Subsequently, a foam is formed by exposing the gel to radiant energy under vacuum in an amount adequate to puff the gel into a foam by boiling the solvent. As optional steps, additives may be added, such as active ingredients (for example, a drug), and the gel may be frozen prior to exposure to radiant energy under vacuum.

Many advantages of using radiant energy drying under vacuum, relative to existing dehydration methods commonly used for biomaterial sponges can be realized. For example, using the method of the invention, there is no need to add an additional step to create pores in the foams using supplemental methodologies because it can be incorporated into the drying step. For example, salt leaching, gas foaming, phase separation etc. are not necessary. Of course, these steps may be optionally added to the inventive process, but they are not necessary to achieve a foam structure. Using radiant energy under vacuum to drying a gel, pores in a foam are formed by the pressure difference established between the inside and outside of the material due to steam generation.

Another advantage of certain aspects of the invention is that there is no requirement to use organic solvents for preparing foams and sponges. With conventional drying methodologies, organic solvents may be added and then removed in a processing or drying step. Of course, it may be desirable to add some organic solvent to the aqueous solvent according to the invention in order to achieve a desired effect, and this is an option that may be undertaken. However, it is not necessary for the instant invention. According to the invention, uniform absorption of electromagnetic energy can be achieved by physical movement of the material through the radiant energy field, such as a microwave field. In the case where microwaves are used, the microwave energy is absorbed directly into the material. If this process takes place in a vacuum, quick drying will occur, and pores are generated in the material. Thereafter the porous form of the product can be stabilized by dehydration to increase foam rigidity to a desired level. During the time of dehydration due to the effect of optional application of thermal energy, additional cross linking of the hydrogel material can take place.

Further advantages of foams formed according to the instant invention are that foams can be made stronger and stiffer than with other methods due to thicker pore walls and the optional thermal cross-linking that may be used to chemically strengthen the cell walls. Pores are formed during the drying process, and thus there is no need for a separate pore-forming step. By controlling the Young's modulus property of the material, the applied vacuum strength and radiant power applied, the inventive method allows control over pore size as well as form strength and rigidity. Advantageously, an open, interconnected pore structure can be achieved, which is desirable for many applications requiring an accessible surface. Also, dehydration to any water activity can be accomplished, not just to very low water activities (less than 0.40) which are accomplished with freeze drying. It may be desirable to have a higher water activity (closer to 0.85) in order to accomplish a softer sponge.

Depending on the wet hydrogel density and Young's modulus, an increase or decrease in pore size is made possible. Unlike freeze drying, oil incorporated into the foams of the instant invention resulted in a foam of high mechanical strength upon REV drying. Further, material having higher initial Young's modulus has more micro pores compared to meso and macro pores. On other hand, at an easily determined level of Young's modulus for a particular material, there is increase in percentage of meso and micro pores with an increase in Young's modulus. After that level, a reversed effect can be observed by increasing the Young's modulus.

Young's modulus is a property of the starting materials, and can be altered using different proportions and combinations of hydrocolloid polymeric material, biomaterial, solvents, additives, and/or surfactants. In the following examples, the range of Young's modulus of the hydrogels tested as from 0.16 to 3000 kPa. An increasing trend in pore size was found up to 274.4 kPa and after that the trend was to decrease. The stiffness of the dried solid can be manipulated according to the invention. Stiffness increases with an increase in initial Young's modulus. Control of pore size is also possible by adjusting the initial Young's modulus of the wet hydrogel and/or by changing the applied vacuum level. The initial Young's modulus can be altered by following different cross linking procedures for preparing wet hydrogels as well as by altering the type and quantity of materials used.

Unlike other dehydration techniques, application of radiant energy under vacuum gives a greater pore wall strength in the resulting foam, possibly due to thermal cross linking during dehydration. This can be illustrated by stress strain relationship curves provided in the examples below.

Foams or sponges formed according to the invention have many uses. One such use is as an internal or external absorbent, for example, after surgery or in the treatment of burns. If a sponge can be degraded by the human body, it can be left in place, thus eliminating the problems that are associated with the removal and replacement of conventional absorbents. One condition that a gel based sponge or foam ought to satisfy, apart from its compatibility, sorption capacity and degradability, is that it should be mechanically stable for certain applications.

Certain hydrocolloid sponges, known as microbicidal sponges, have been shown to have potential as prophylactics against transmission of causative agents of sexually transmitted diseases (STDs) including AIDS and herpes (Neurath et al. 2003). A microbicidal sponge may advantageously possess the following features: 1) the microbicidal activity is a built in property of the foam, so that the structural component of the foam comprises the active ingredient, 2) it should absorb physiological fluids and then disintegrate; 3) pathogens should bind to the foam structure and become rapidly inactivated; 4) the foam can be converted into soft gel so that it need not be removed; 5) low production costs are desirable if the product is to be suitable for use in developing countries; 6) amenability to industrial mass production is likewise desirable, as is integration of manufacture and packaging, and 7) capacity to augment a healthy acidic vaginal environment would be a useful attribute, as would potential for modifications leading to product application as rectal microbicides (Neurath et al., 2002).

Tissue engineering applications may also employ the foam produced according to the invention. The foam may provide a porous scaffold on which tissue may grow. Further, the material may provide a biodegradable composite that can either be used structurally within a human or animal body, and slowly disintegrate as needed either during healing or for slow release of the ingredients forming the composite. In the case of bone tissue, the open cell structure of the foam employed as a scaffold may permit growth of bone tissue and may even be used to provide nutrients or materials that encourage cell or tissue formation. In certain applications, the sponge or foam itself may be prepared out of biological material (for example, collagen, skim milk powder, lactose, trehalose, or honey), and full control over the temperature is achievable so that any biological materials incorporated into the foam will not denature at higher temperatures. For example, if biological material is used as the polymeric material, a temperature of less than 65° C. may be maintained, or even a temperature below 37° C., in order to ensure no disadvantageous effect on biological molecules. Such ingredients for this application may include cells, microorganisms, live attenuated microbes, yeasts, probiotics, antibiotics, vaccines, growth promoting substances, hormones, and biological proteins such as enzymes.

Sponges or foams formed according to the invention can also be used for targeted drug delivery. As noted above, biologically active ingredients such as drugs may be incorporated into the structure of the foam so that the drug is retained in the structure. Should such a structure be implanted into a human or animal body, slow release of a biodegradable foam would result in release of the drug to the area local to the implanted foam. The rate at which such drugs or active agents would be released could be manipulated by the characteristics of the foam. Again, this method offers the great advantage that even heat-sensitive drugs may be incorporated into the structure because the drying method uses vacuum and radiant energy in combination in such a way as to avoid high temperatures that may destroy or denature such ingredients.

When employed for surgical parts or other applications relating to surgical manipulation of a human or animal body, the sponge or foam may be used to absorb, to replace removed materials, as a scaffold on which new tissue may grow, or as a slow release effect to release medication as required to the surgical area, for example to prevent infection or rejection.

As wound dressings, sponges or foams prepared according to the invention may be used either internally or externally to the body. The option of having a slowly biodegradable wound dressing that incorporates a medicinal or otherwise active ingredient in the matrix of the sponge or foam is encompassed by the invention.

Examples of sponges or foams formed according to the invention are provided below.

Example 1

Microbicidal Sponge Formed with Freezing

Pectin, CAP, methyl cellulose and glycerol were mixed with a proportion of respectively 2:3:1:1 (% w.b) homogeneously using rotary type laboratory mixer (Ultra Turrax, T25 basis; IKA Labor technic). After mixing the homogeneous mixture was gelled. The mixture was heated up to 80±5° C. using laboratory water bath (Magni Whirl constant temperature bath, Blue M electric company, Ill., USA) then allowed to cool to room temperature. After the cooling step, the gelled material was cut into required shape using circular hollow cylindrical die.

After measuring initial moisture content (air oven method) and Young's modulus (compression test using Texture Analyzer, TA-XT2 model, Stable Micro System, USA) the sample was quick frozen at −35° C. using Forma Bio Freezer (Forma Scientific) for 18±2 h. Then drying was carried out using laboratory vacuum radiant energy dryer. The absolute pressure maintained during drying was 51 mm Hg (i.e., vacuum level was 709 mm Hg) and microwave power applied was 300 watts; the power reflected back to the magnetron varied from 50-100 watts depending on the moisture content of the product during drying. The drying process continued until the product reached 20-25% (calculated) moisture content on wet basis.

The puffed foam material was removed from the drier and packed in polyethylene bags. The final moisture content and water activity of the dried foams were measured after 24 hours of drying (allow the sample to equilibrate) using air oven method and Aqua lab water activity meter (model series 3, Decagon Device Inc., Washington, USA).

Example 2

Microbicidal Sponge Formed without Freezing

Pectin, CAP (Cellulose acetate phathalate), methyl cellulose and glycerol were mixed with a proportion of respectively 2:3:1:1 (% w.b) homogeneously using rotary type laboratory mixer (Ultra Turrax, T25 basis; IKA Labor technic). After mixing the homogeneous mixture was allowed for gelling process. The mixture was heated up to 80±5° C. using laboratory water bath (Magni Whirl constant temperature bath, Blue M electric company, Ill., USA) then allowed to cool to room temperature. After the cooling step the gelled material was cut into required shape using circular hollow cylindrical die.

After measuring initial moisture content (air oven method) and Young's modulus (compression test using Texture Analyzer, TA-XT2 model, Stable Micro System, USA) drying was carried out using laboratory vacuum microwave dryer. The absolute pressure maintained during drying was 51 mm Hg (i.e., vacuum level was 709 mm Hg) and microwave power applied was 300 watts. The drying process continued until the product reached 20-25% (calculated) moisture content on wet basis.

The puffed foam structure was removed from the drier and packed in polyethylene bags. The final moisture content and water activity of the dried foams were measured after 24 hours of drying (allow the sample to equilibrate) using air oven method and Aqua lab water activity meter (model series 3, Decagon Device Inc., Washington, USA).

Table 1 illustrates the properties of pectin-containing hydrocolloid sponges described in the Examples 1 and 2, and variations thereon formed with processes similar to those described in Examples 1 and 2 with the exception of the process parameters described in the table. Features of the starting material and product formed after REV exposure and drying are provided. These data illustrate product qualities that may be influenced and manipulated by variations in process parameters. The initial mass of each trial was 100 grams.

Table 2 provides properties of HPMC hydrocolloid foams described in Examples 3 and 4, and variations thereon formed with processes similar to those described in Examples 3 and 4 with the exception of the process parameters described in the table. Features of the starting material and product formed after REV exposure and drying are provided. These data illustrate product qualities that may be influenced and manipulated by variations in process parameters. The initial mass of each trial was 100 grams.

TABLE 1

Properties of Hydrocolloid Sponges Containing Pectin

| | Starting Material | | Process | | | | Products | | |
|---|---|---|---|---|---|---|---|---|---|
| Sample composition in percentage wet basis | Initial Moisture % w·b | Young's Modulus $kg \cdot m^{-1} \cdot s^{-2}$ | Energy Watts | Drying rate, g water/min | Total drying time Min | Total drying time Sec | Final moisture, % w·b | Bulk density, $kg \cdot m^{-3}$ | Water activity |
| Pectin 3; Gelatin 3; Glycerol 1 | 93 | 2428.7 | 402 | 3.8 | 35 | 45 | 15.14 | 166 | 0.544 |
| Pectin 3; Gelatin 5; Glycerol 1 | 91 | 6574.4 | 500 | 4.7 | 25 | 01 | 37.45 | 353 | 0.663 |
| Pectin 5; Gelatin 3; Glycerol 1 | 91 | 7423.1 | 402 | 4.49 | 37 | 19 | 11.38 | 310 | 0.712 |
| Pectin 2; CAP 3; Methylcellulose1 Glycerol 1[a] | 93 | 2436.4 | 300 | 2.2 | 34 | 48 | 30.9 | 520 | 0.796 |
| Pectin 2; CAP 2; Methylcellulose1 Glycerol 1 | 94 | 2564.6 | 300 | 1.95 | 35 | 00 | 19.9 | 390 | 0.563 |
| Pectin 4; CAP 4; Methylcellulose1 Glycerol 1 | 90 | 3176.8 | 302 | 2.13 | 44 | 06 | 18.0 | 1200 | 0.600 |
| Pectin 3; CAP 5; Methylcellulose1 Glycerol 1 | 90 | 4201.7 | 302 | 1.76 | 38 | 15 | 37.13 | 524 | 0.856 |
| Pectin 4; CAP 5; Methylcellulose2 Glycerol 1 | 88 | 3855.3 | 302 | 1.75 | 38 | 44 | 36.54 | 608 | 0.848 |
| Pectin 3; Methylcellulose3; Glycerol 1 | 95 | 3613.5 | 402 | 3.2 | 29 | 00 | 16.1 | 170 | 0.570 |
| Pectin4; Methylcellulose4; Glycerol 1 | 91 | 4061.3 | 402 | 3.26 | 35 | 02 | 23.4 | 198 | 0.680 |
| Pectin4; Methylcellulose3 Glycerol 1 | 92 | 3432.2 | 402 | 3.37 | 36 | 20 | 24.6 | 182 | 0.654 |
| Pectin 4; Gelatin 4; Glycerol 1 | 91 | 4279.5 | 304 | 4.46 | 17 | 30 | 13.96 | 500 | 0.465 |
| Pectin 5; Gelatin 5; Glycerol 1 | 89 | 11454 | 302 | 4.97 | 16 | 30 | 7.95 | 413 | 0.444 |

[a]This formulation used in Examples 1 and 2

TABLE 2

Properties of Hydrocolloid Foams Containing HPMC

| | Initial Moisture | Viscosity | Energy | Drying rate (g) | Total drying time | | | Final moisture | Bulk density | Water |
|---|---|---|---|---|---|---|---|---|---|---|
| Sample composition in percentage wet basis | % w·b | $kg \cdot m^{-1} \cdot s^{-1}$ | Watts | water/min | Hr | Min | Sec | % w·b | $kg \cdot m^{-3}$ | activity |
| HPMC4000-0; HPMC400-4; Glycerol 2 | 94 | 8.550 | 20.82 | 0.56 | 1 | 40 | 00 | 37.96 | 520 | 0.460 |
| HPMC4000-1; HPMC400-3; Glycerol 2 | 94 | 15.680 | 22.8 | 0.56 | 1 | 40 | 00 | 37.12 | 340 | 0.423 |
| HPMC4000-2; HPMC400-2; Glycerol 2 | 94 | 25.000 | 18.67 | 0.58 | 1 | 31 | 18 | 41.4 | 660 | 0.421 |
| HPMC4000-4; HPMC400-0; Glycerol 2 | 94 | 34.500 | 21.13 | 0.38 | 2 | 40 | 00 | 33.9 | 660 | 0.412 |
| HPMC4000-4; HPMC400-1; Glycerol 1 | 94 | 25.400 | 14.66 | 0.74 | 1 | 42 | 00 | 18.2 | 410 | 0.437 |

Example 3

HPMC:Glycerol Foam Formed with Freezing

About 6 g of HPMC and glycerol mixture was mixed with 94 g water to make 6% solid solution. HPMC of two different viscosities were used. One was at 4000 cp and other one was 400 cp. Amount of glycerol was varied between 0 and 2 g. Both HPMC were varied from 1 to 6 g depending on the amount of glycerol. Total 6% of the mixture was mixed using mechanical stirrer with 94% of water. After mixing the viscosity of the solution was measured using Brookfield viscometer (Brookfield, Mass., 02346 U.S.A) of RV type. About 100 g of the sample was frozen for 18±1 h before drying. Then application of REV was done with controlled power and pressure. The puffed sample was then removed from the vacuum microwave dryer and packed in polyethylene self sealing bags.

Example 4

HPMC:Glycerol Foam Formed without Freezing

About 4 g of hydroxy propyl methyl cellulose (HPMC 4000 cp) and 2 g of glycerol was mixed with 94 g water to make 6% solid solution. HPMC of two different viscosities were used. One was at 4000 cp and other one was 400 cp. Amount of glycerol was varied between 0 and 2 g. Both HPMC were varied from 1 to 6 g depending on the amount of glycerol. Total 5-6% of the solid was mixed using mechanical stirrer with water. During mixing it formed foam. So after mixing the solution was kept without any disturbance and foam was allowed to settle. After that viscosity of the solution was measured using Brook Field™ viscometer (Brookfield, Mass., 02346 U.S.A) of RV type.

About 100 g of the sample was allowed to puff using REV at controlled power and pressure. After that puffed sample was removed from the vacuum microwave dryer and packed using polyethylene self-sealing bags.

Example 5

About 7 g of sodium alginate was mixed with 93 g of water using magnetic stirrer to achieve a homogeneous solution. About 20 g of cornstarch or tapioca starch was mixed with 80 g of water separately. Both starch solution and alginate solution were mixed to achieve a uniform and continuous phase of starch and alginate. Next the mixed solution was dispensed drop-wise into a 1% (w/v) solution of calcium chloride. There was a spontaneous calcium cross link formed and the alginate starch mix was gelled. Small beads were producing at varying diameter from 2-4 mm. Then calcium chloride solution was removed and beads were air-dried for 1 hour to remove the surface moisture, with several changes of blotting paper. The free-flowing non-sticky beads were frozen at −35° C. for 18 hours and then dried using REV at 600 Watts power and 50 mm Hg absolute pressure. After that the puffed beads were removed and packed using polyethylene self sealing bags. The cross cut beads were viewed under microscope with 40 magnification power. It showed a cellular matrix covered with a thin film of material to form a porous bead.

Example 6

Locust bean gum (3%), pectin (2%), methyl cellulose (2%) and tapioca starch (3%) were mixed with 2% coconut oil, 2% bee wax, and 0.5% glycerol (all w/w). The amount of water to prepare hydrocolloid solutions was calculated as 90% (w/w) without considering the added coconut oil, bee wax and glycerol. First weighed amounts of bee wax was melted, coconut oil and glycerol were added to the hot molten wax and then the calculated amount of locust bean gum, pectin, methyl cellulose, tapioca starch and water were added. All were mixed well using a hand blender to achieve a homogeneous solution.

Approximately equal amounts of the homogeneous hydrocolloid solution was poured into small plastics cups (bottom inner diameter 43 mm, upper inner diameter 56 mm and height 25 mm). Cups were placed in a freezer at −80° C. (Forma™ Bio Freezer, Forma Scientific) to quick freeze and mold the solution. The frozen molds were separated from the cups and gels were immersed in 1.5% calcium chloride solution at room temperature for 24 hours to produce gel. The mechanism involved in the gel preparation is a cross link between the calcium chloride and locust bean gum as well as between pectin and calcium chloride. This made the gel shapes stable and resulted in a soft solid structure. The amount of calcium chloride solution used was sufficient to immerse all the frozen gels. During the immersion time, thawing of the frozen molds and the cross linking took place simultaneously. Initial and final moisture content (air oven method) was measured, as well as Young's modulus (Texture Analyzer, TA-XT2 model, Stable Micro System, USA).

Drying was carried out using a laboratory vacuum microwave dryer. The absolute pressure maintained during drying was 25 mm Hg and microwave power applied was 600-700 watts. The drying process continued until the product reached 10-15% (calculated) moisture content on a wet basis. The puffed foam structure was removed from the drier and packed in polyethylene bags. The final moisture content and water activity of the dried foams were measured using an Aqua lab water activity meter (model series 3, Decagon Device Inc., Washington, USA) after 24 hours of drying (allowing the sample to equilibrate) using and air oven.

Example 7

Hydrogel was prepared by mixing sodium alginate 2%, high methoxy pectin 3%, carrageenan 2%, methyl cellulose 1%, tapioca starch 2%, glycerol 0.5%, coconut oil 2% and bee wax 2% (all w/w). The amount of water used to prepare the hydrocolloid solution was calculated as 90% (w/w) without considering the added coconut oil, bee wax and glycerol. First, a weighed amount of bee wax was molten, coconut oil and glycerol were added to the molten wax, and then the calculated amount of sodium alginate, pectin, carrageenan, methyl cellulose, tapioca starch and water were added.

Equal amounts of the homogeneous hydrocolloid solution was poured into small plastic cups (bottom inner diameter 43 mm, upper inner diameter 56 mm and height 25 mm). These cups were placed in a freezer at −80° C. (Forma Bio Freezer, Forma Scientific) to quick freeze and mold the solution. The frozen molds were separated from the cups and gels were immersed in 1.5% calcium chloride solution at room temperature for 24 hours to produce gel. The mechanism involved in the gel preparation is a cross link between the calcium chloride and sodium alginate. This made the gel shapes stable and resulted in a soft solid structure. The amount of calcium chloride solution used was sufficient to immerse all the frozen gels. During the immersion time, thawing of the frozen molds and the cross linking took place simultaneously. Initial and final moisture content (air oven method) was measured, as well as Young's modulus (Texture Analyzer, TA-XT2 model, Stable Micro System, USA).

Drying was carried out using a laboratory vacuum microwave dryer. The absolute pressure maintained during drying was 25 mm Hg and microwave power applied was 600-700 watts. The drying process continued until the product reached 10-15% (calculated) moisture content on a wet basis. The puffed foam structure was removed from the drier and packed in polyethylene bags. After 24 hours of drying (allowing the sample to equilibrate using an air oven method) the final moisture content and water activity of the dried foams were measured using an Aqua lab water activity meter (model series 3, Decagon Device Inc., Washington, USA).

Example 8

A sodium alginate gel was prepared as in Example 7, the only variation being the incorporation of sodium bicarbonate and citric acid. Incorporation of salt and acid was used in order to change the pore size characteristics. Sodium bicarbonate (1%) was mixed along with other ingredients. After achieving a homogeneous mix, 1% citric acid was added and again mixed to homogeneity using a hand blender. At this time, since acid foaming took place between the salt and acid, the volume of the whole mix increased. The percentage of salt and acid is not included as total solid to calculate water percentage.

Approximately equal amounts of the homogeneous hydrocolloid solution was poured into small plastic cups (bottom inner diameter 43 mm, upper inner diameter 56 mm and height 25 mm). These cups were placed in a freezer at −80° C. (Forma Bio Freezer, Forma Scientific) to quick freeze and mold the solution. The frozen molds were separated from the cups and gels were immersed in 1.5% calcium chloride solution at room temperature for 24 hours to produce gel. The mechanism involved in the gel preparation is a cross link between the calcium chloride and sodium alginate. This made the gel shapes stable and a soft solid structure. The amount of calcium chloride solution used was sufficient to immerse all the frozen gels. During the immersion time, thawing of the frozen molds and the cross linking took place simultaneously. Initial and final moisture content (air oven method) was measured, as well as Young's modulus (Texture Analyzer, TA-XT2 model, Stable Micro System, USA).

Drying was carried out using a laboratory vacuum microwave dryer. The absolute pressure maintained during drying was 25 mm Hg and microwave power applied was 600-700 watts. The drying process continued until the product reached 10-15% (calculated) moisture content on a wet basis. The puffed foam structure was removed from the drier and packed in polyethylene bags. The final moisture content and water activity of the dried foams were measured after 24 hours of drying (allow the sample to equilibrate using air oven method) using an Aqua lab water activity meter (model series 3, Decagon Device Inc., Washington, USA).

Example 9

A sodium alginate gel was prepared as in Example 8, with only difference being a variation in the time of addition of citric acid. Citric acid (1%) was added later during the gelling process along with the calcium chloride treatment for gel making. Thus, gelling and acid foaming took place simultaneously. All ingredients were mixed well using hand blender to achieve a homogeneous solution.

Approximately equal amounts of the homogeneous hydrocolloid solution was poured into small plastic cups (bottom inner diameter 43 mm, upper inner diameter 56 mm and height 25 mm). These cups were placed in a freezer at −80° C. (Forma Bio Freezer, Forma Scientific) to quick freeze and mold the solution. The frozen molds were separated from the cups and gels were immersed in the mix of 1% citric acid and 1.5% calcium chloride solution at room temperature for 24 hours to produce gel. The mechanism involved in the gel preparation is a cross link between the calcium chloride and sodium alginate and gas foaming due to the reaction between sodium bicarbonate and citric acid. Initial moisture content (air oven method) and Young's modulus (Texture Analyzer, TA-XT2 model, Stable Micro System, USA) were measured.

Drying was carried out using a laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate using an air oven method) using an Aqua lab water activity meter (model series 3, Decagon Device Inc., Washington, USA).

Example 10

A sodium alginate gel was prepared as in Example 8, with the only difference being a variation in the time of addition of citric acid. Citric acid (1%) was added later, after the hydrogel was made using calcium chloride treatment. All ingredients were mixed well using hand blender to achieve a homogeneous solution.

Approximately equal amounts of the homogeneous hydrocolloid solution was poured into small plastic cups (bottom inner diameter 43 mm, upper inner diameter 56 mm and height 25 mm). These cups were placed in a freezer at −80° C. (Forma Bio Freezer, Forma Scientific) to quick freeze and mold the solution. The frozen molds were separated from the cups and gels were immersed in and 1.5% calcium chloride solution at room temperature for 24 hours to produce gel. The mechanism involved in the gel preparation is a cross link between the calcium chloride and sodium alginate. After this treatment the wet hydrogels were immersed into 1% citric acid solution. The amount of solution was maintained enough to immerse all the hydrogels. During this time, it was expected that space formed by leaching out the sodium bicarbonate solution could be filled with citric acid to alter the strength of the hydrogel. After measuring initial moisture content (air oven method) and Young's modulus (Texture Analyzer, TA-XT2 model, Stable Micro System, USA).

Drying was carried out using laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate) using air oven method and Aqua lab water activity meter (model series 3, Decagon Device Inc., Washington, USA).

Example 11

A sodium alginate gel was prepared as in Example 7, with the only difference being the addition of corn starch instead of tapioca starch. All ingredients were mixed well using hand blender to achieve a homogeneous solution.

Approximately equal amounts of the homogeneous hydrocolloid solution was poured into small plastic cups (bottom inner diameter 43 mm, upper inner diameter 56 mm and height 25 mm). These cups were placed in a freezer at −80° C. (Forma Bio Freezer, Forma Scientific) to quick freeze and mold the solution. The frozen molds were separated from the cups and gels were immersed in 1.5% calcium chloride solution at room temperature for 24 hours to produce gel. The mechanism involved in the gel preparation is a cross link between the calcium chloride and sodium alginate. This made the gel shapes stable and a soft solid structure. The amount of calcium chloride solution used was sufficient to immerse all the frozen gels. During the immersion time, thawing of the frozen molds and the cross linking took place simultaneously. Initial moisture content (air oven method) and Young's modulus (Texture Analyzer, TA-XT2 model, Stable Micro System, USA) were measured.

Drying was carried out using laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allowing the sample to equilibrate, using the air oven method) using an Aqua lab water activity meter (model series 3, Decagon Device Inc., Washington, USA).

Example 12

Gelatin 10%, low methoxy pectin 5%, corn starch 10% and glycerol 1% were mixed with 75% of water. The amount of glycerol is not considered to calculate the water percentage. To achieve a homogeneous mix, heating the mix using a boiling water bath and mixing with a hand blender were done simultaneously. The temperature of the solution mix was maintained 70-80° C. during mixing. After preparing a homogeneous solution, it was poured into small plastic cups (bottom inner diameter 43 mm, upper inner diameter 56 mm and height 25 mm) approximately equal amounts in each cup. These cups were placed in a cold room 10° C. to achieve a hard gel structure. After the formation of hard gel they were frozen in a freezer at −80° C. (Forma Bio Freezer, Forma Scientific) to achieve a quick freeze before drying. Initial moisture content (air oven method) and Young's modulus (Texture Analyzer, TA-XT2 model, Stable Micro System, USA) were measured before freezing the sample.

Drying was carried out using laboratory vacuum microwave dryer. The absolute pressure maintained during drying was 25 mm Hg, and the microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate, using the air oven method) using an Aqua lab water activity meter (model series 3, Decagon Device Inc., Washington, USA).

Example 13

A hydrogel was prepared as in Example 12, with the exception that after the cold room treatment step, the gel was frozen at −80° C. (Forma Bio Freezer, Forma Scientific) to achieve a quick freeze. After that, the frozen molds were immersed in a 1.5% calcium chloride solution for 24 hours to result in more gel strength. After this step, initial moisture content (air oven method) and Young's modulus (Texture Analyzer, TA-XT2 model, Stable Micro System, USA) were measured. Again the formed hydrogels were quick frozen before drying.

Drying was carried out using a laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate, using air oven method) using an Aqua lab water activity meter (model series 3, Decagon Device Inc., Washington, USA).

Example 14

Sodium alginate 2%, pectin (HM) 3%, carrageenan 2%, corn starch 2%, methyl cellulose 1%, glycerol 1% were mixed with coconut oil 10% (not included in total solid count) and then this mix was combined with 90% water using a hand blender to achieve homogeneity.

Approximately equal amounts of the homogeneous hydrocolloid solution was poured into small plastic cups (bottom inner diameter 43 mm, upper inner diameter 56 mm and height 25 mm). These cups were placed in a freezer at −80° C. (Forma Bio Freezer, Forma Scientific) to quick freeze and mold the solution. The frozen molds were separated from the cups and gels were immersed in 1.5% calcium chloride solution at room temperature for 24 hours to produce gel. The mechanism involved in the gel preparation is a cross link between the calcium chloride and sodium alginate. This made the gel shapes stable and resulted in a soft solid structure. The amount of calcium chloride solution used was sufficient to immerse all of the frozen gels. During the immersion time, thawing of the frozen molds and the cross linking took place simultaneously. After this step, initial moisture content (air oven method) and Young's modulus (Texture Analyzer, TA-XT2 model, Stable Micro System, USA) were measured.

Drying was carried out using laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate) using air oven method and Aqua lab water activity meter (model series 3, Decagon Device Inc., Washington, USA).

Example 15

Sodium alginate 1.5%, pectin (HM) 3%, carrageenan 2%, methyl cellulose 1%, glycerol 0.5% were mixed with 92% water (glycerol amount was included in total water percentage calculation). After mixing, the solution was poured into a cylindrical tube which can be split into two halves. The halves of the tube were pasted together using cloth tapes to avoid leakage when the solution is inside by blocking tightly the one end (called bottom end). After filling this tube, the top was closed using proper lid. The filled tube was kept inside the freezer at −80° C. to freeze the solution. After freezing, the tube was split into two by removing the block, lid and sealing tapes. Then this cylindrical frozen solution was immersed inside the 1.5% calcium chloride solution to perform thawing and gelling due to the cross link between sodium alginate and calcium chloride. After the hydrogel was made, it was cut into small cylindrical pieces of 1-1.5 cm height. After this step, initial moisture content (air oven method) and Young's modulus (Texture Analyzer, TA-XT2 model, Stable Micro System, USA) were measured. These pieces were frozen before drying.

Drying was carried out using laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate using air oven method) using an Aqua lab water activity meter (model series 3, Decagon Device Inc., Washington, USA).

Example 16

Sodium alginate 3%, pectin (HM) 1.5%, corn starch 10%, methyl cellulose 2%, glycerol 0.5% were mixed with 83% water (glycerol amount was included in total water percentage calculation). After mixing, the solution was poured in a cylindrical tube which can be split into two halves, and the cylinder was pasted using cloth tapes to avoid leakage when the solution is inside by blocking tightly the one end (called the bottom end). After filling this tube the top was closed using a proper lid. The tube was kept inside the freezer at −80° C. to freeze the solution. After becoming frozen, the tube was split into two by removing the block, lid and sealing tapes. Then this cylindrical frozen solution was immersed inside the 1.5% calcium chloride solution to perform thawing and gelling due to the cross link between sodium alginate and calcium chloride. After the hydrogel was made, it was cut into small cylindrical pieces of 1-1.5 cm height. Initial moisture content (air oven method) and Young's modulus (Texture Analyzer, TA-XT2 model, Stable Micro System, USA) were measured. These pieces were frozen before drying.

Drying was carried out using a laboratory vacuum microwave dryer. The absolute pressure maintained during drying was 25 mm Hg and microwave power applied was 600-700 watts. The drying process continued until the product reached 10-15% (calculated) moisture content on wet basis. The puffed foam structure was removed from the drier and packed in polyethylene bags. The final moisture content and water activity of the dried foams were measured after 24 hours of drying (allow the sample to equilibrate using an air oven method) using an Aqua lab water activity meter (model series 3, Decagon Device Inc., Washington, USA).

Example 17

Manipulation of Pore Size in Foams

Pore size analysis of different dry hydrogels is examined in this example. The figures discussed later in this example (FIG. 2 to FIG. 9) show the pore size distribution of difference hydrogels, having different initial Young's modulus. The mercury pore sizer (Poresizer 9320, Micromeritics Instrument Corporation, Georgia, USA) was used to find the pore size, pore size distribution, and pore volume of various hydrocolloid sponges developed using vacuum microwave dryer. This instrument can be operated from low pressure of 1 psia to high pressure of maximum 30,000 psia to analyze the pores of different sizes. This instrument at high pressure is capable of measuring very small pores with a lower limit of 1.8 nm. Mercury intrusion and extrusion volumes can be plotted vs. pore radius or pressure as a continuous curve on x-y coordinates.

For analyzing hydrocolloid sponges, about 0.5 g of cut samples were placed in the penetrometer. Before using the sample for pore size analysis, they were borne dried and stored in a silica gel desiccator. After placing the sample inside the penetrometer bulb, a dummy rod from the low pressure running port of the poresizer was removed and the penetrometer stem was inserted there slowly and fixed properly. Then, they were cleansed of absorbed and adsorbed gases by degassing in a vacuum of about 50 micrometer of mercury (mm Hg) using step by step level. The penetrometer with sample still under vacuum was then filled with mercury by increasing the pressure inside the penetrometer gradually. Initial filling of mercury up to 22-25 psia was carried at low pressure running port. Each mercury fill reading was recorded in the computer fixed with pore size analysis software. After 25 psia pressure, mercury fill was stopped and the instrument was bring back to the atmospheric pressure of about 14.2-15.2 psia. After that the sample along with the mercury filled penetrometer was removed carefully from the low pressure running port and the excess mercury stuck on the penetrometer stem was wiped off, weight of the penetrometer with sample and mercury was measured and then used for running at high pressure.

The high pressure running port was opened by opening the vent valve and threading out the leaver arm and filling with sufficient amount of hydraulic liquid. After that, the penetrometer was fixed inside the port in such a way that bulb of penetrometer touches the bottom of the high pressure running port and the stem was fixed inside the leaver arm, then it was threaded in slowly to avoid air bubbles and fixed tightly. After that the vent valve on top of the head was closed. After closing the vent valve, a small portion of the hydraulic liquid was raised in the vent valve and care was taken to remove all the air bubbles existing in this raised liquid. Then the instrument was run at high pressure using automatic control mode. To increase the pressure compressed air source was used. The pressure was increased from 25 psia to 30,000 psia gradually. During this run the mercury inside the penetrometer was forced inside the pores present in the sample by increasing the pressure. As the pressure in the penetrometer increased, the mercury was forced into the pores of the sample and the mercury level in the stem of the penetrometer decreased. Mercury level decline in the stem (intrusion in the pores) was recorded as volume change as function of pressure automatically. Pore size distribution was calculated by converting the pressure into a pore radius using Washburn equation (Equation 1). After reaching the maximum pressure, extrusion of mercury from the pore space was done automatically by reducing the pressure. The penetrometer was removed carefully from the high pressure running port after the instrument reached to atmospheric pressure and then cleaned. Data were used for result analysis.

$$D = -4 * \gamma (\cos \theta)/P \qquad \text{Equation 1}$$

where, $D$ ((mm) is the diameter of the pore size, $\gamma$ is the surface tension of liquid used (mercury, usually 480 dyne.cm$^{-2}$), $\theta$ is the angle of contact of the liquid used (mercury, usually 140° angle) and $P$ (psia) is the pressure applied.

FIG. 2 to FIG. 9 illustrate pore throat size histograms for foams formed under a variety of conditions and having different average initial Young's modulus measurements. Clearly, pore size can be manipulated by varying foam forming conditions.

Figure 2:
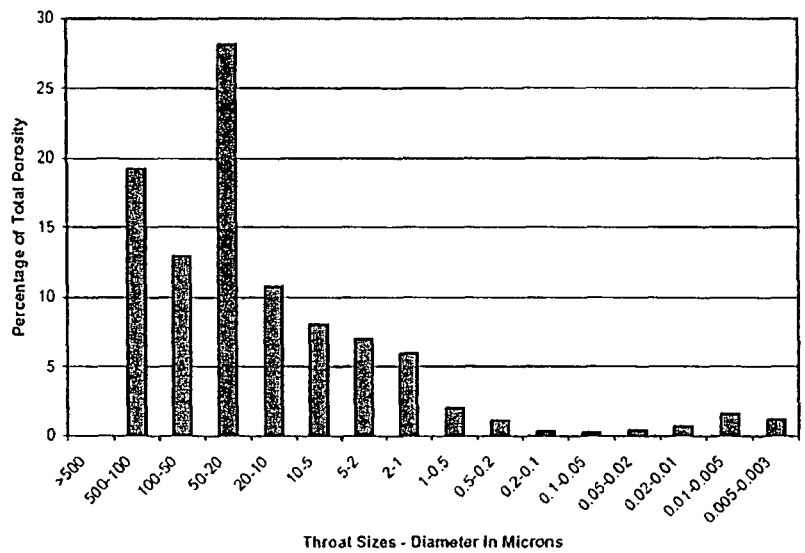
FIG. 2 shows pore throat size distribution for a foam having an average initial Young's modulus of 0.16 kPa.

FIG. 2 shows pore throat size distribution for a foam having an average initial Young's modulus of 0.16 kPa. For a pore size range of 100-500 micron, the percentage is about 19% and the foam has a greater percentage (28%) of pores within the pore size range of 20-50 micron. From this, it can be seen that percentage of different pore sizes increases gradually from 0.2 micron to 20 microns.

Figure 3:
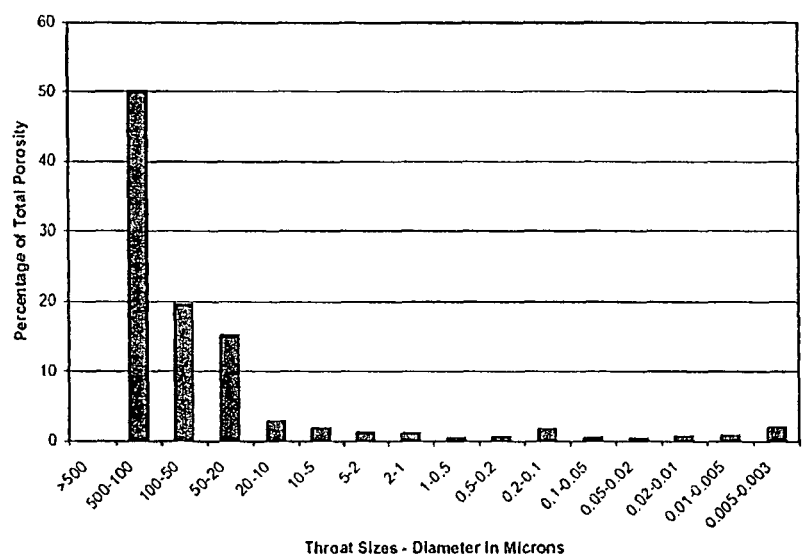
FIG. 3 shows pore throat size distribution for a foam having an average initial Young's modulus of 6.1 kPa.

FIG. 3 shows pore throat size distribution for a foam having an average initial Young's modulus of 6.1 kPa. This histogram illustrates a greater percentage in the pore size range of 100-500 micron (about 50%), while the range of 50-100 micron is about 20%. The increase in initial Young's modulus increases the percentage of pore size in the macro pore region.

Figure 4:
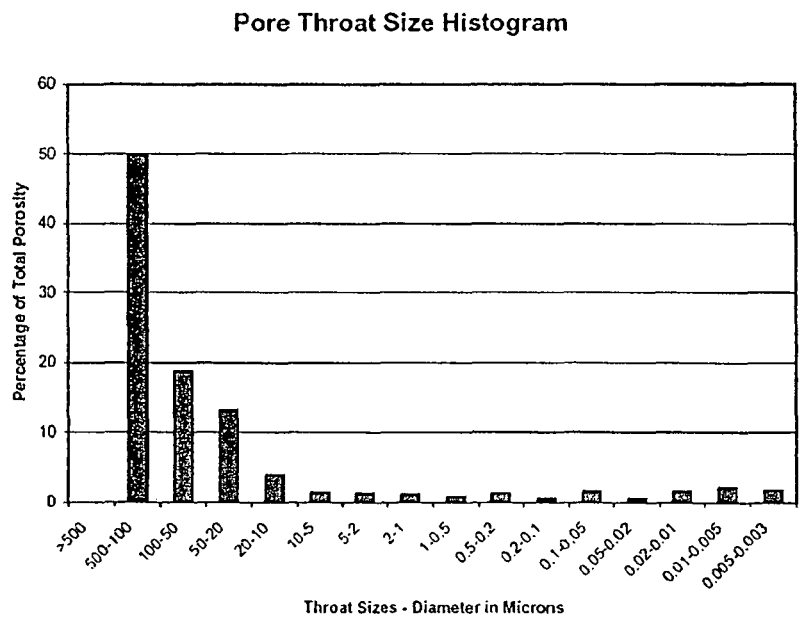
FIG. 4 shows pore throat size distribution for a foam having an average initial Young's modulus of 16.3 kPa.

FIG. 4 shows pore throat size distribution for a foam having an average initial Young's modulus of 16.3 kPa. This histogram shows that initial modulus of this range does not differ significantly fro that observed at 6.1 kPa (FIG. 3). It can be seen that foams formed having a Young's modulus from 6.1 to 16.3 kPa will result in a similar size of pore formation during REV.

Figure 5:
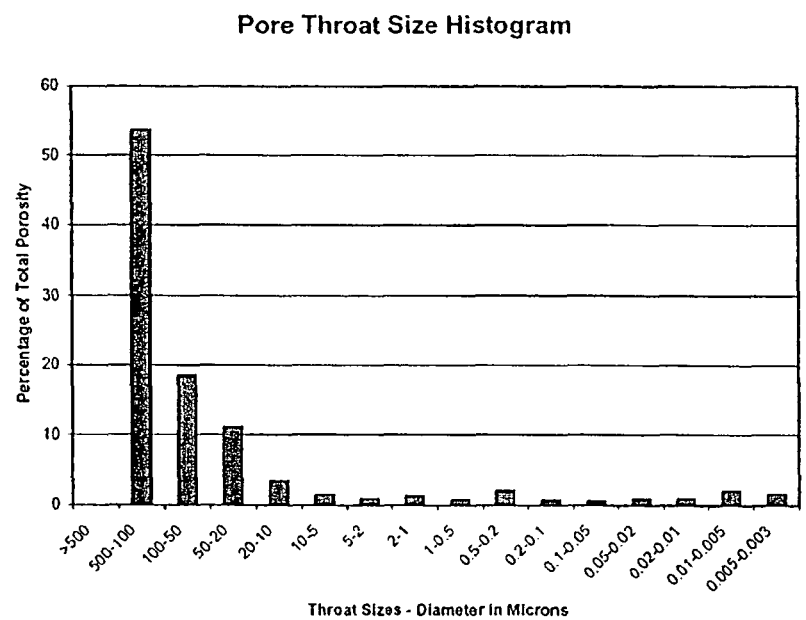
FIG. 5 shows pore throat size distribution for a foam having an average initial Young's modulus of 27.1 kPa.

FIG. 5 shows pore throat size distribution for a foam having an average initial Young's modulus of 27.1 kPa. This histogram shows about 55% of the pores are in the range of 100-500 micron. It shows that an increase in the percentage of pores in the macro pore region can be achieved by increasing the initial modulus. Further, a similar percentage of pores are found in the size ranges 50-100 and 20-50 micron. This confirms that higher modulus can be used to achieve a higher percentage of large pores.

Figure 6:
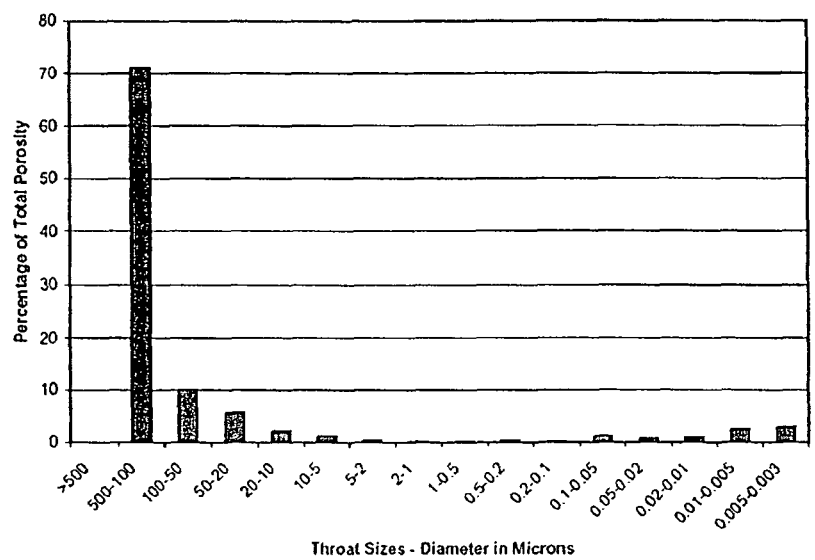
FIG. 6 shows pore throat size distribution for a foam having an average initial Young's modulus of 274.4 kPa.

FIG. 6 shows pore throat size distribution for a foam having an average initial Young's modulus of 274.4 kPa. This histogram shows about 71% of pores are in the pore size range of 100-500 micron at an average Young's modulus of 274.4 kPa. Further, about 10% of pores are found in the 50-100 micron ranges. Again, the increase in modulus increased the percentage of pores in the macro pore region.

Figure 7:
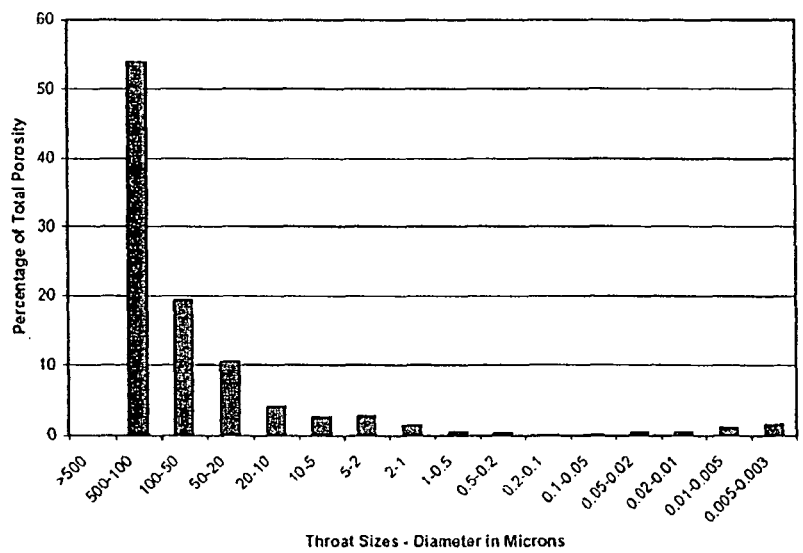
FIG. 7 shows pore throat size distribution for a foam having an average initial Young's modulus of 732.5 kPa.

FIG. 7 shows pore throat size distribution for a foam having an average initial Young's modulus of 732.5 kPa. This histogram shows that pore percentage (55%) in 100-500 micron range is reduced by an increase in the modulus value. Also the distribution of pores in the pore size ranges from 50-100 and 20-50 is similar to the pore distribution at modulus of 27.1 kPa (FIG. 5). It seems that at this value of Young's modulus there is an increasing trend in percentage of macro pore size ranges from 100-500 micron. Beyond this modulus value, a decreasing pattern is observed.

Figure 8:
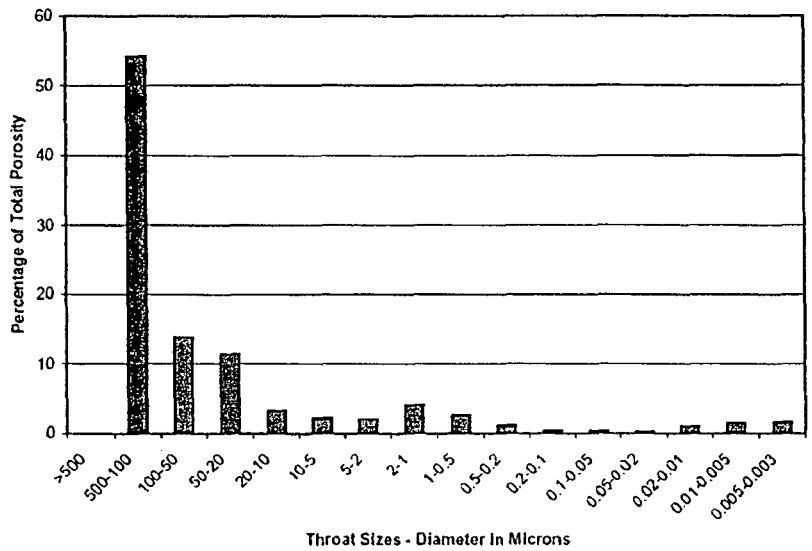
FIG. 8 shows pore throat size distribution for a foam having an average initial Young's modulus of 1175 kPa.

FIG. 8 shows pore throat size distribution for a foam having an average initial Young's modulus of 1175 kPa. This histogram illustrates that at this modulus value, the same percentage for 100-500 micron ranges is observed as is seen at 732.5 kPa (FIG. 7). However the percentage for 50-100 and 20-50 micron are less than observed at 732.5 kPa Young's modulus.

Figure 9:
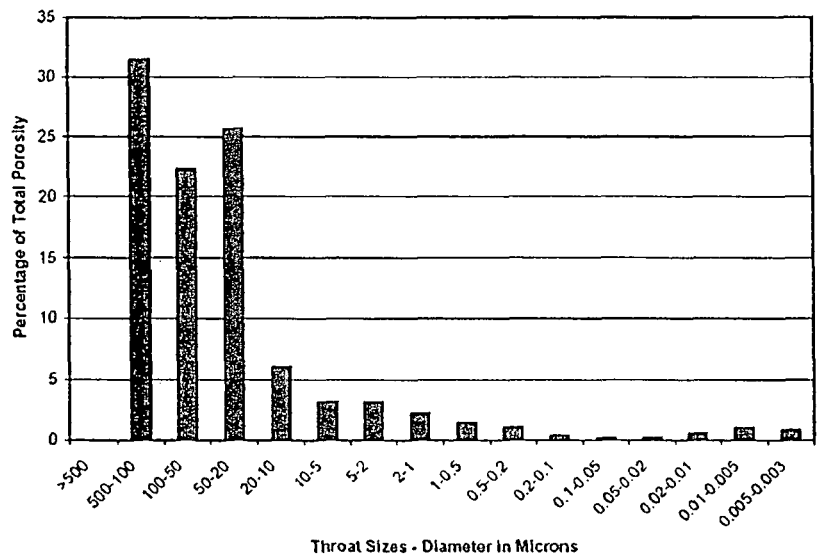
FIG. 9 shows pore throat size distribution for a foam having an average initial Young's modulus of 3000 kPa.

FIG. 9 shows pore throat size distribution for a foam having an average initial Young's modulus of 3000 kPa. From this data, it is clear that an extreme increase in Young's modulus results in a decrease in the percentage of pores in macro size. It shows that about 32% of pores are in the 100-500 micron range, but at 50-100 (23%) and 20-50 (26%) micron the percentage is more than is seen at the other lower modulus values.

Example 18

Mechanical Properties of Dried Hydrogel

Initial Young's Modulus

The mechanical properties of dried hydrogels can be manipulated by altering the initial Young's Modulus of the material used. In this example, FIG. 10 to FIG. 17 show the stress strain distribution of the different dried cellular solids at about 0.45-0.55 water activity rages. They were characterized based on their initial Young's modulus.

At about 5% (w.b) moisture content it is difficult to cut dried cellular solids without disturbing the pores. Therefore dried solids were equilibrated at 60-70% relative humidity environment to increase the water activity. Then the solids were cut to uniform size and shape. For the cut samples, the water activity was adjusted to 45-55% by equilibration and compressive characteristics was measured using Texture Analyzer (TA-XT2 model, Stable Micro System, USA) by applying uneasily compressive force for 70-80% deformation. The rate of strain was fixed at 1 mm per s or equivalent. Data points of force, distance and time were collected and they were analyzed for true stress and stain relationships. Since it was consider that the cross sectional area of the compressed cellular solids expands very rarely, for true stress calculation the cross sectional area of the solid was treated as equal in all points. True strains were calculated at Hanky's strain for cellular solids.

Figure 10:
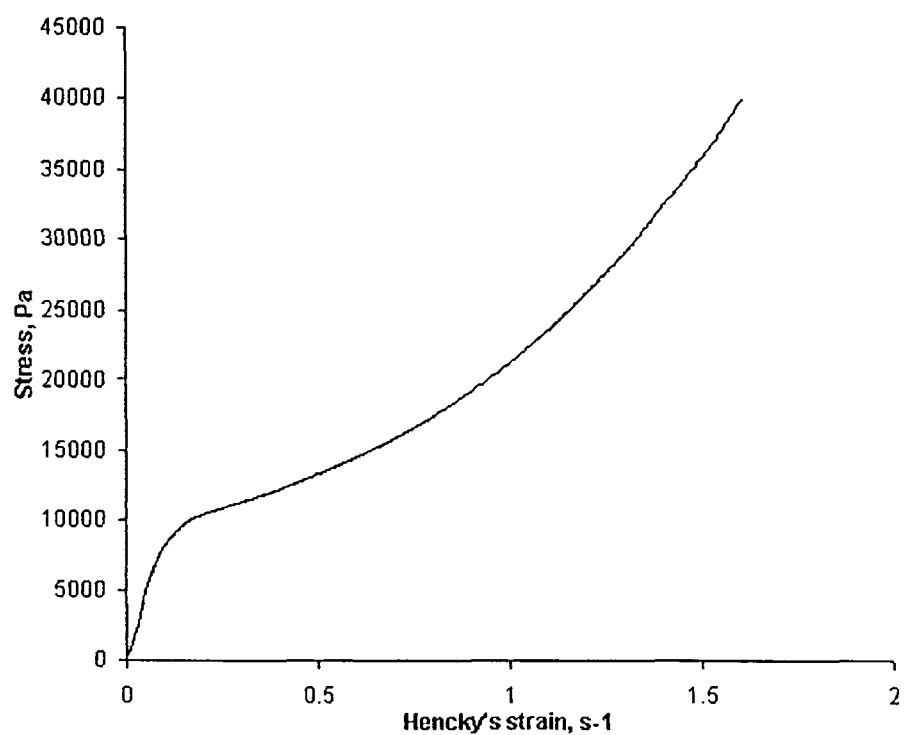
FIG. 10 shows the stress-strain relationship of dried cellular solid of average Initial Young's modulus 0.16 kPa.
Figure 11:
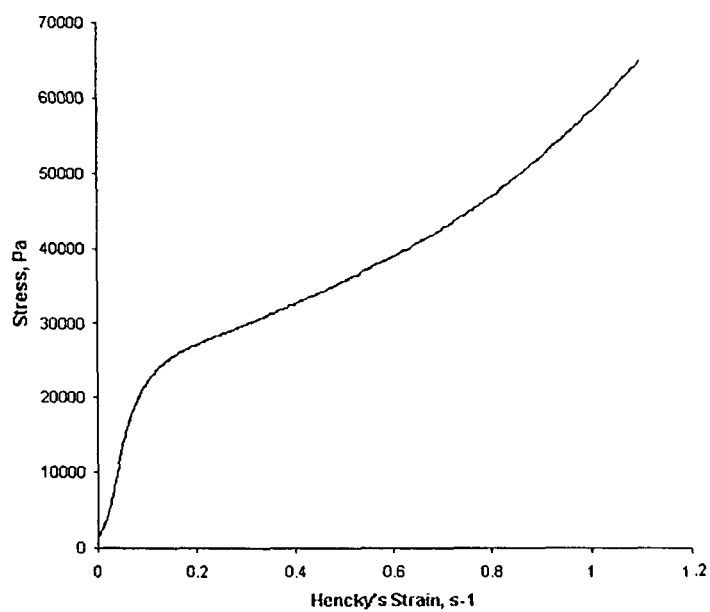
FIG. 11 shows the stress-strain relationship of dried cellular solid of average Initial Young's modulus 6.1 kPa.
Figure 12:
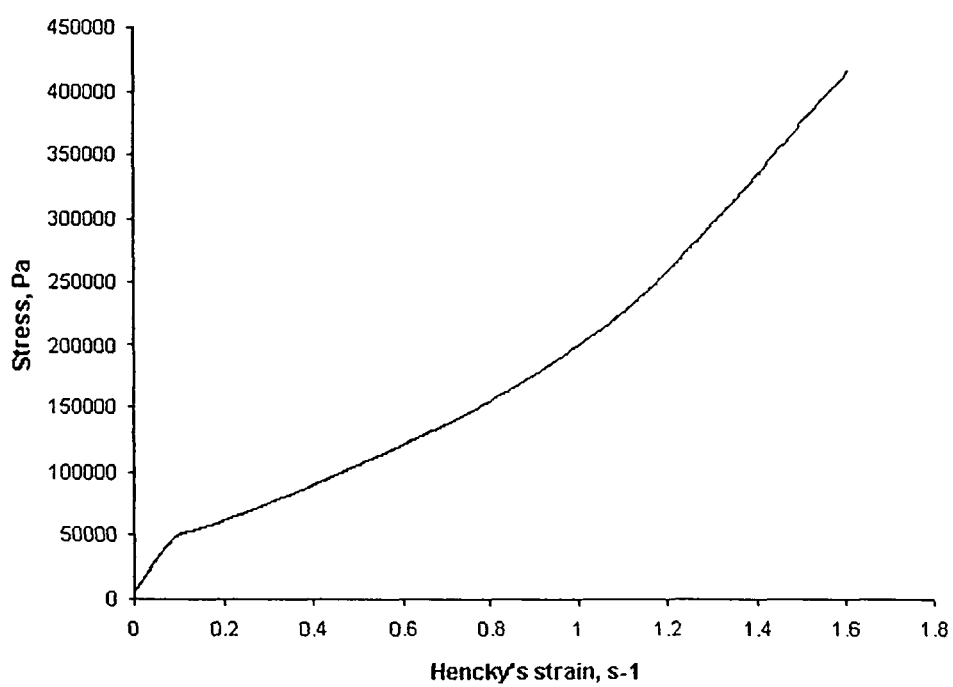
FIG. 12 shows the stress-strain relationship of dried cellular solid of average Initial Young's modulus 16.3 kPa.

FIG. 10, FIG. 11 and FIG. 12 show the stress-strain curve for an elastomeric foam. FIG. 10 shows the stress-strain relationship of dried cellular solid of average Initial Young's modulus 0.16 kPa. FIG. 11 shows the stress-strain relationship of dried cellular solid of average Initial Young's modulus 6.1 kPa. FIG. 12 shows the stress-strain relationship of dried cellular solid of average Initial Young's modulus 16.3 kPa. Each curve has an initial elastic region after which, a short cell wall collapse region is illustrated. Further down the curve, there is shown a densification region. By observing these figures carefully, it can be seen that a lowest initial modulus (FIG. 10) exhibits an elastic region until up to the stress level of 1000 Pa. However, however the 6.1 kPa initial modulus (FIG. 11) has up to 25000 Pa, and the 16.3 kPa curve (FIG. 12) has up to 50000 Pa. It is clear that an increase in initial Young's modulus also influences the mechanical properties of the dried solid.

Figure 13:
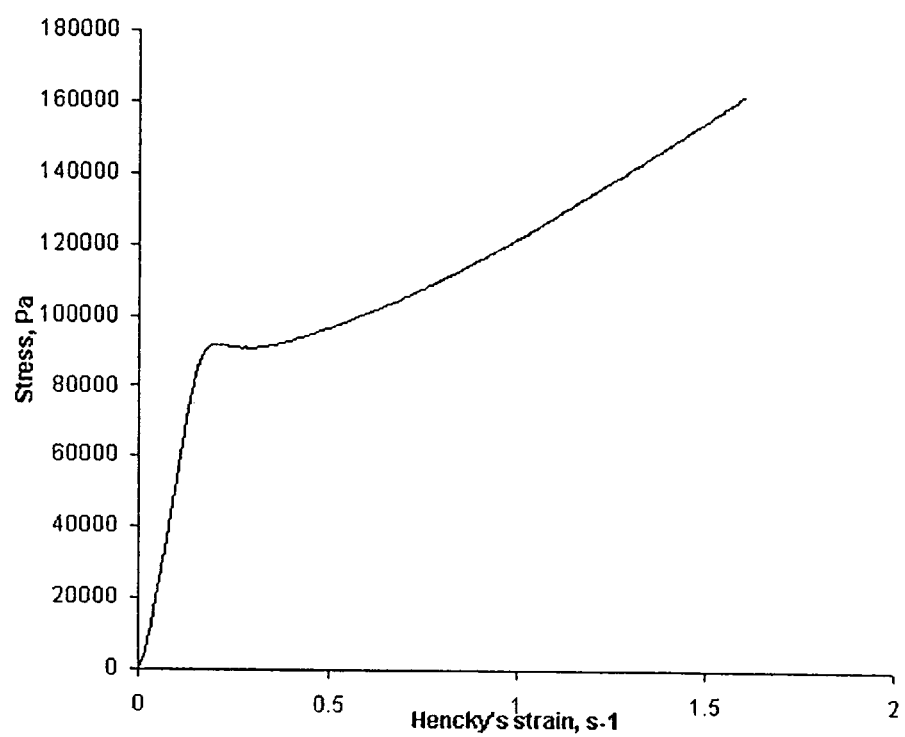
FIG. 13 shows the stress-strain relationship of dried cellular solid of average Initial Young's modulus 27.1 kPa.

FIG. 13 shows the stress-strain relationship of dried cellular solid of average Initial Young's modulus 27.1 kPa. These data show the compressive curve as plastic foam, by giving elastic buckling after the linear elastic region and then a densification region. However the increase in initial modulus increases the stress in the linear elastic region up to 9000 Pa.

Figure 14:
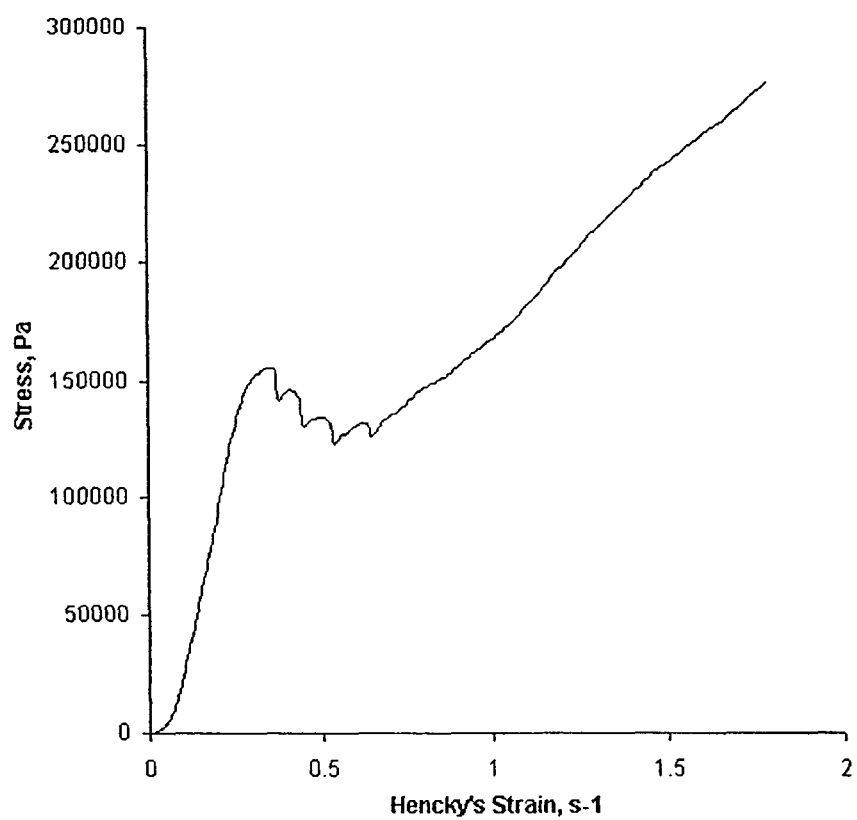
FIG. 14 shows stress-strain relationship of dried cellular solid of average Initial Young's modulus 274.4 kPa.

FIG. 14 shows stress-strain relationship of dried cellular solid of average Initial Young's modulus 274.4 kPa. The sample shown behaves like brittle foam with an initial linear elastic region, followed by brittle crushing and then by densification. This also gives the increase in linear elastic region stress up to 15000 Pa.

Figure 15:
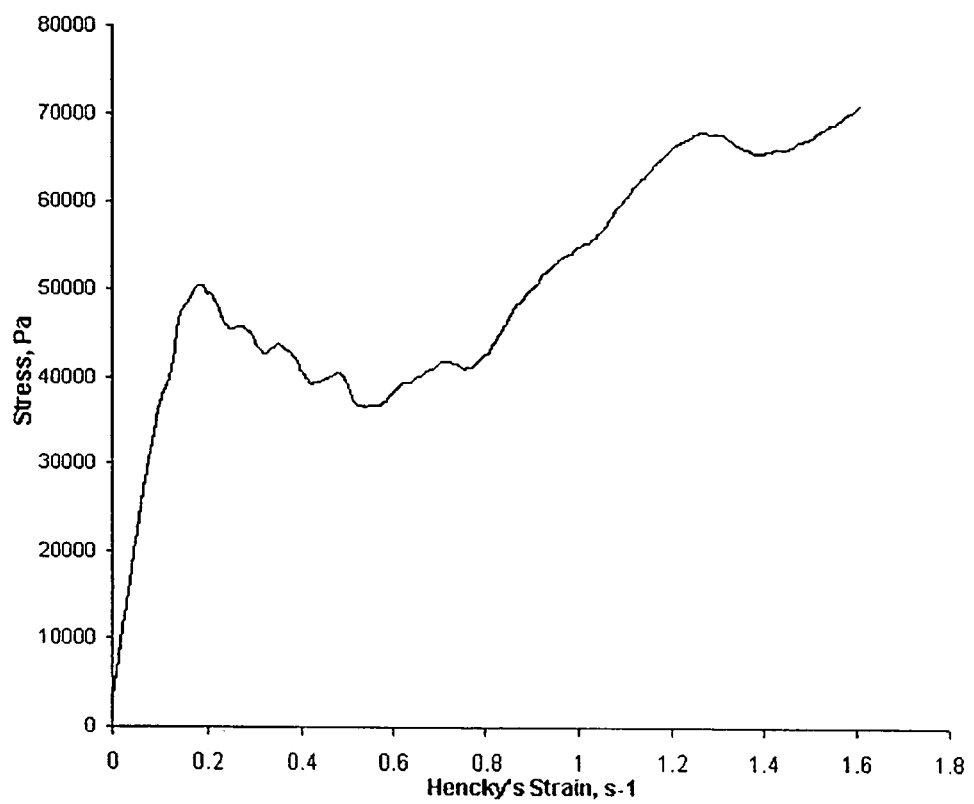
FIG. 15 shows the stress-strain relationship of dried cellular solid of average Initial Young's modulus 732.5 kPa.
Figure 16:
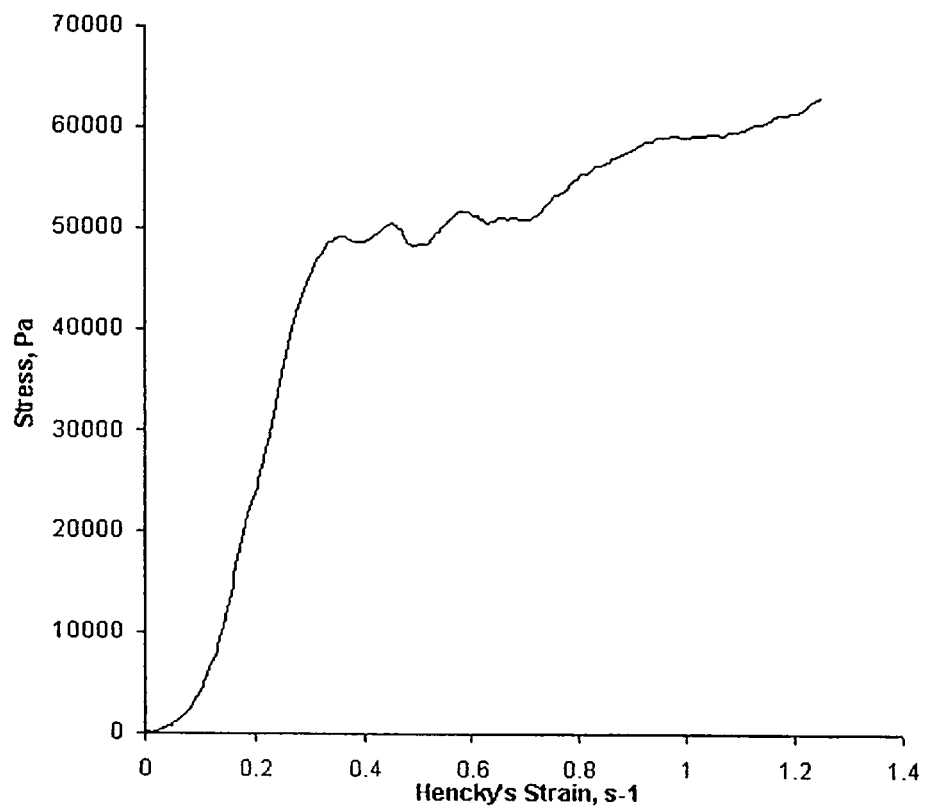
FIG. 16 shows the stress-strain relationship of dried cellular solid of average Initial Young's modulus 1173.5 kPa.

FIG. 15 shows the stress-strain relationship of dried cellular solid of average Initial Young's modulus 732.5 kPa. FIG. 16 shows the stress-strain relationship of dried cellular solid of average Initial Young's modulus 1173.5 kPa. These data illustrate the mechanical properties of the dried. In both cases, the solids are behaving like a brittle foam at the water activity tested. However, stress at the initial linear elastic region is reduced relative to the sample having initial modulus of 274.4 kPa (FIG. 14). When we combine this with the pore size distribution properties, the samples of 732.5 and 1173.5 kPa have a smaller percentage of pore sizes in 100-500 micron range compared to 274.4 kPa sample. Also, they have similar pore size distribution patterns. Similarly they have similar stress-strain relationship within the initial linear elastic region stress of 5000 Pa.

Figure 17:
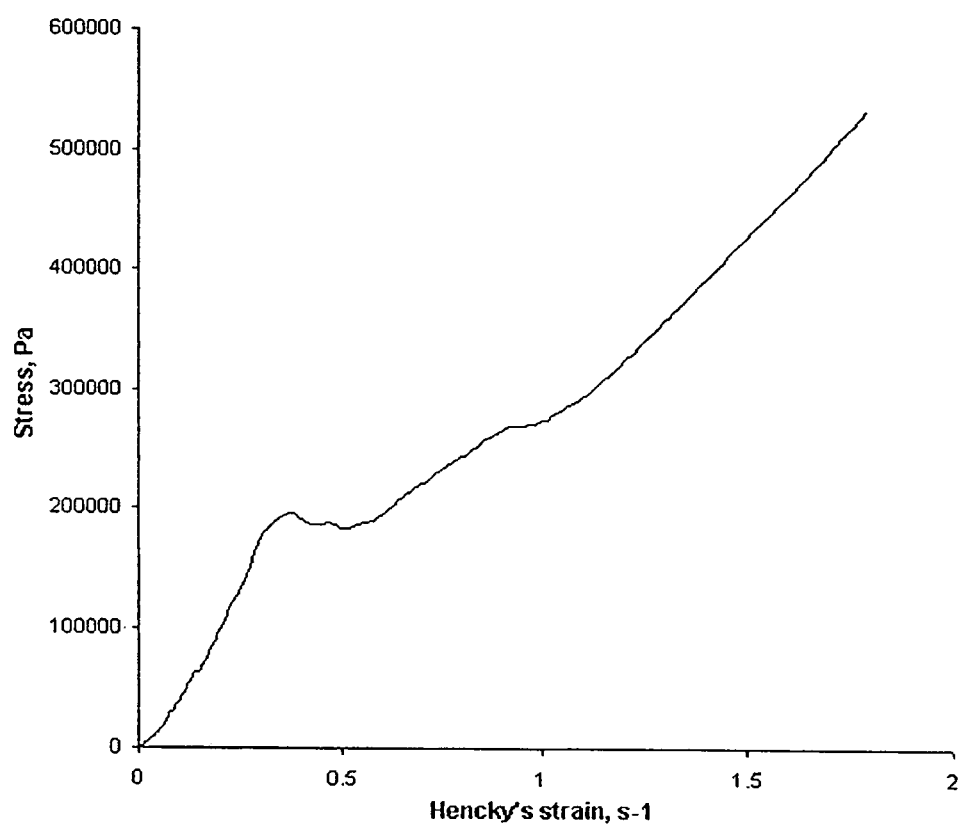
FIG. 17 shows the stress-strain relationship of dried cellular solid of average Initial Young's modulus 3000 kPa.
Figure 18:
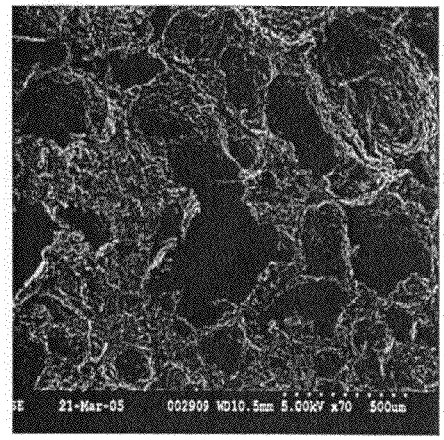
FIG. 18 is an SEM view of a foam having an initial modulus of 6.1 kPa.
Figure 19:
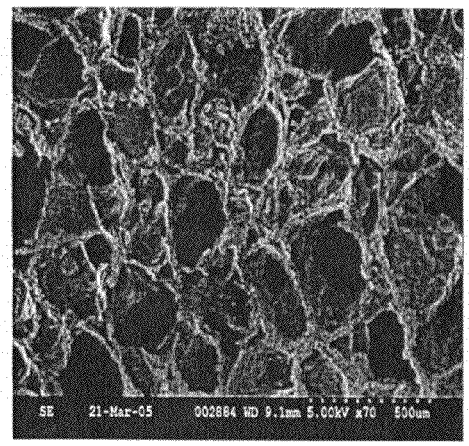
FIG. 19 is an SEM view of a foam having an initial modulus of 16.3 kPa.
Figure 20:
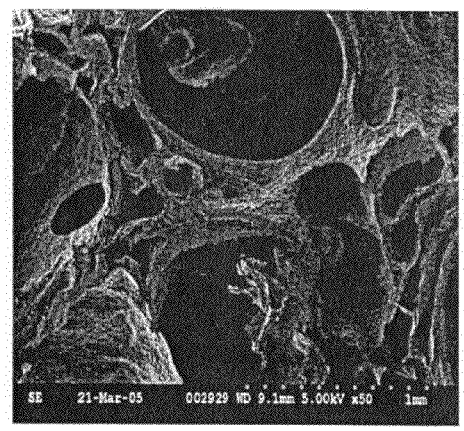
FIG. 20 is an SEM view of a foam having an initial modulus of 27.1 kPa.
Figure 21:
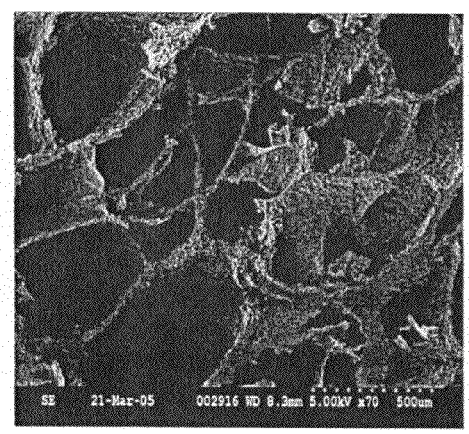
FIG. 21 is an SEM view of a foam having an initial modulus of 732.5 kPa.
Figure 22:
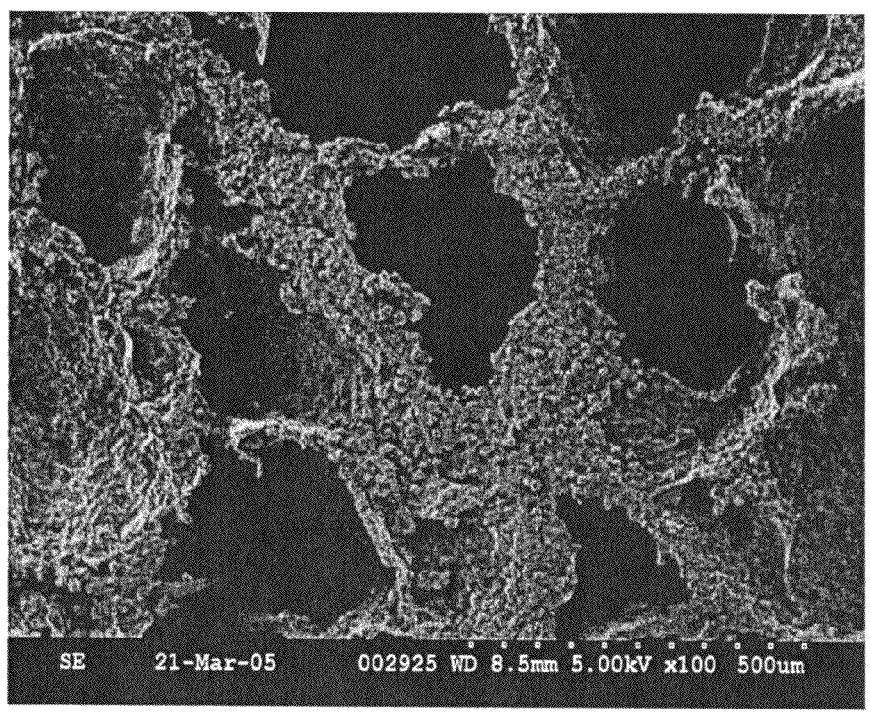
FIG. 22 is an SEM view of a foam having an initial modulus of 1173.5 kPa.
Figure 23:
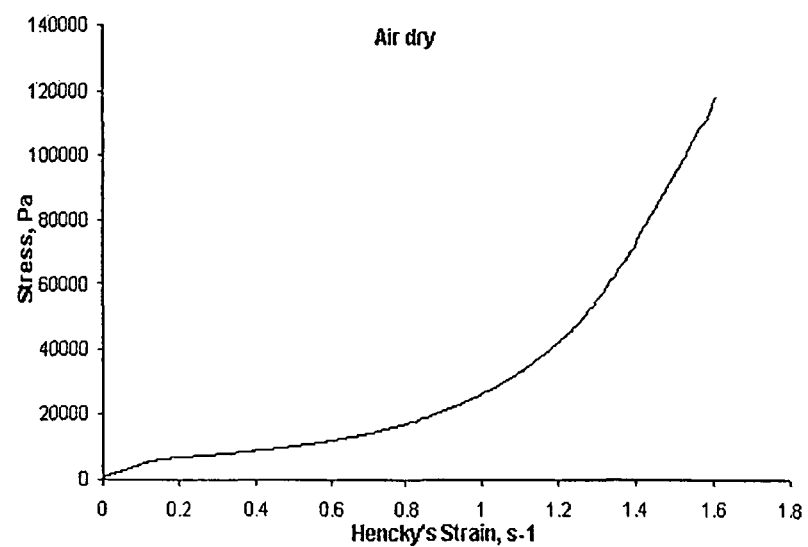
FIG. 23 shows the stress-strain relationship of an air-dried sponge formed according to PRIOR ART methods.

FIG. 17 shows the stress-strain relationship of dried cellular solid of average Initial Young's modulus 3000 kPa. This illustrates a brittle foam type relationship. The stress at the linear elastic region is very high compared to all other dried cellular solids. It shows almost 20,000 Pa stress, and provides more stiffness. In general, the higher the shoulder length (stress at linear elastic region) the higher will be the mechanical strength of dried cellular solids.

Even though the initial Young's modulus of the sample given in FIG. 15 and FIG. 16 are different, the reason for a lower shoulder length may be the processing method of the hydrogel. A decrease in dry solid Young's modulus is related to an increase in water activity. Thus, depending on the desired application (whether a hard foam or soft sponge is required) a change in the water activity we can be used to manipulate this feature.

FIG. 18 to FIG. 22 provide scanning electron micrographs to illustrate the cellular structure of solids used in this Example after exposure to radiant energy under vacuum, having 6.1, 16.3, 27.1, 732.5 and 1173.5 kPa initial Young's modulus values, respectively.

These figures shows the internal pore structures of different dried cellular solids having various initial Young's modulus which is obtained due to the use of different biomaterial combinations as well as various processing methods of wet hydrogel preparation. The variation in pore structure and pore wall strength are due to the variation in initial modulus of the samples.

These data serve to illustrate that pore size distribution within a foam can be manipulated by altering the average initial Young's modulus value of the starting material. Thus, the method according to the invention allows a user to achieve a pore structure that is optimal for the intended application.

Comparative Example 1

Driving Sponges Using Conventional Methods

To illustrate further the relative ease and other advantages of the instant invention, the following examples illustrate stress-strain relationship curves and SEM view of sponges formed using prior art methodology, for example, air drying, vacuum drying and freeze drying. FIG. 23 to FIG. 26 show the stress strain relationship of dry sponges from locust bean gum, and dried using four different drying methods, three of which are prior art: air drying (prior art), vacuum drying (prior art), freeze drying (prior art), and drying with radiant energy under vacuum according to the invention. The air dried, freeze dried and vacuum dried sponges were less stiff when compared to the sponge prepared by REV drying. Even though freeze dried and REV dried sponges have similar qualities, the mechanical strength of the REV sponge is greater. SEM analysis of these sponges also provides a clear picture of pores and their arrangement. FIG. 27 to FIG. 30 show SEM views of sponges dried using the four different drying methods: air drying, vacuum drying, freeze drying, and drying with radiant energy under vacuum according to the invention.

Figure 24:
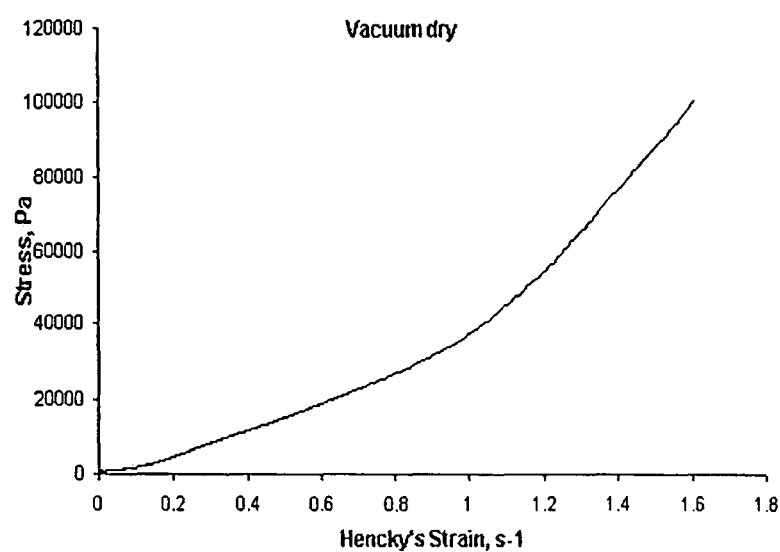
FIG. 24 shows the stress-strain relationship of a vacuum dried sponge formed according to PRIOR ART methods.

FIG. 24 shows the stress strain relationship of a vacuum dried sponge. The curve shows that the sponge behaves like an elastomeric foam. Also the curve indicates that vacuum dried sponges have more closed pores than open pores. This can also be seen in FIG. 28, which shows the SEM view of pores present in the vacuum dried sample. The initial increase of stress was found to be slow, but after a certain strain, the stress increases steeply. The compressive strain may accelerate the air and vapor pressure buildup in the closed cells. At higher pressure, cell walls break and collapse. After this stage, the compressive stress increases rapidly, since all cells have collapsed, leaving a bulk solid rather than a closed-cell solid.

The stress strain curve obtained for an air dried sponge (FIG. 23) shows that this type of sponge behaves like an elastomeric foam. Of course, the linear elasticity is limited to small strains and is followed by a long plateau. Further analysis of this curve indicates more open pores than closed pores. This shows a long plateau, in which the closed pores show a steep increase in stress with increasing strain in the collapse region. FIG. 27 shows a SEM view of pores present in the air dried sample. Pores are interconnected and open. In general pores are formed in the later stage of drying in the case of air drying, and the interconnection of pores is more attributable to structural collapse at higher temperature than to the glass transition temperature of the materials used for producing the sponge.

Figure 25:
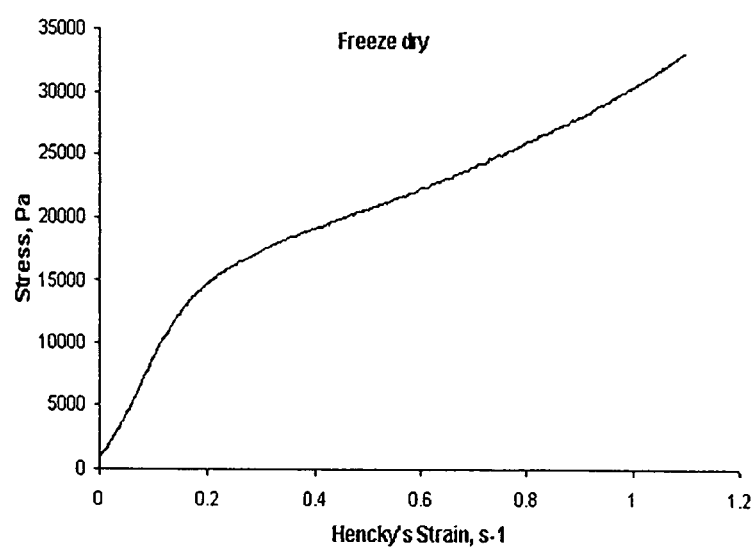
FIG. 25 shows the stress-strain relationship of a freeze dried sponge formed according to PRIOR ART methods.

Freeze dried sponges also behave like elastomeric foams (FIG. 25). The curve for the freeze dried sponge shows more densification than the air dried sponge. This may be due to the open pores in air dried solids becoming closed pores, so that the air and water vapor pressure inside the pore gives resistance to full densification due to higher pore wall strength than is seen with freeze dried samples. Structural collapse of the pores can be seen in the SEM view of freeze dried sample (FIG. 29). This also shows that the freeze dried pores are very small compares to other drying methods. Structural collapse may be due to the difference in drying temperature. With air drying, a high drying temperature is used, causing transition of the polymer matrix to a hard rubbery state. However, this kind of transition is not seen in freeze drying due to the low drying temperature.

Figure 26:
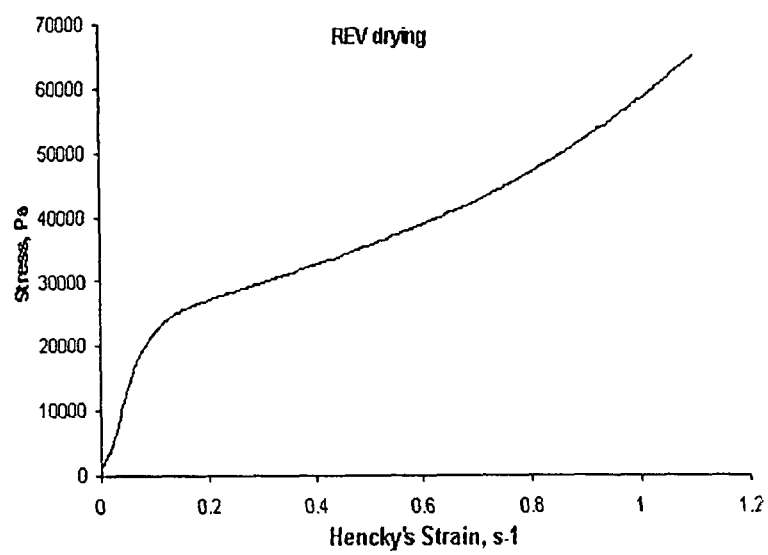
FIG. 26 shows the stress-strain relationship of a sponge formed according to the invention.

The REV dried sponge also behaves like an elastomeric foam (FIG. 26). The open pores become closed in the densification region so there is no sharp increase in stress after the plateau region. However, the magnitude of stress is greater in REV dried foams compared to the air dried or freeze dried foams. FIG. 30 shows the SEM view of pores present in an REV dried sponge. It also illustrates an interconnected pore structure.

This comparative example shows that sponges formed according to an embodiment of the invention have equally desirable or more desirable mechanical properties as those sponges formed using conventional methodologies.

Example 19

Drying Cell Suspensions Using T-REV

Preparation of Bacterial Cell Suspensions.

Pure cultures of probiotic bacteria *Lactobacillus salivarius* 417, *Lactobacillus brevis* (104) #5 and *Bifidobacterium longum* were kindly provided by Neovatech, Abbotsford B.C. Canada. The bacteria were cultured at 37° C. for 24 hours under anaerobic conditions in de man Rogosa and Sharpe (MRS) broth (Fisher Scientific USA). Anaerobic conditions were achieved using an anaerobic jar containing BD BBL™ Gas Pak™ Plus (N2+H2) (Becton, Dickinson and Company USA).

Preparation of Yeast Suspension.

*Saccharomyces cerevisiae* (EC 1118) was kindly provided by Wine Research Centre, UBC. Yeast samples were grown in YPD medium at 30° C., 100 rpm shaking incubator for 24 hours before harvesting.

Sample Preparation for Drying.

All samples went through three sub cultures before drying. Cells were harvested by centrifugation at 3300×g for 10 min at 4° C., then suspended in sterile peptone water (0.1% w/v) and centrifuged again under the same conditions. The harvested microorganisms cells were subsequently used in experiments. For control harvested cells immediately dehydrated by t-REV. The rest were mixed directly with protecting agents including: skim milk powder (10%, 15% and 25%), lactose (10%, 15%), trehalose (10%) or honey (20%) as protecting material then subjected to vacuum microwave drying process. For each treatment a sample was taken aseptically before drying, diluted in sterile peptone water (0.1% (w/v)). Serial dilutions were spread plated on MRS-agar. The numbers of viable cells were enumerated after 48 hours anaerobic incubation at 37° C. and reported as initial population.

Figure 31:
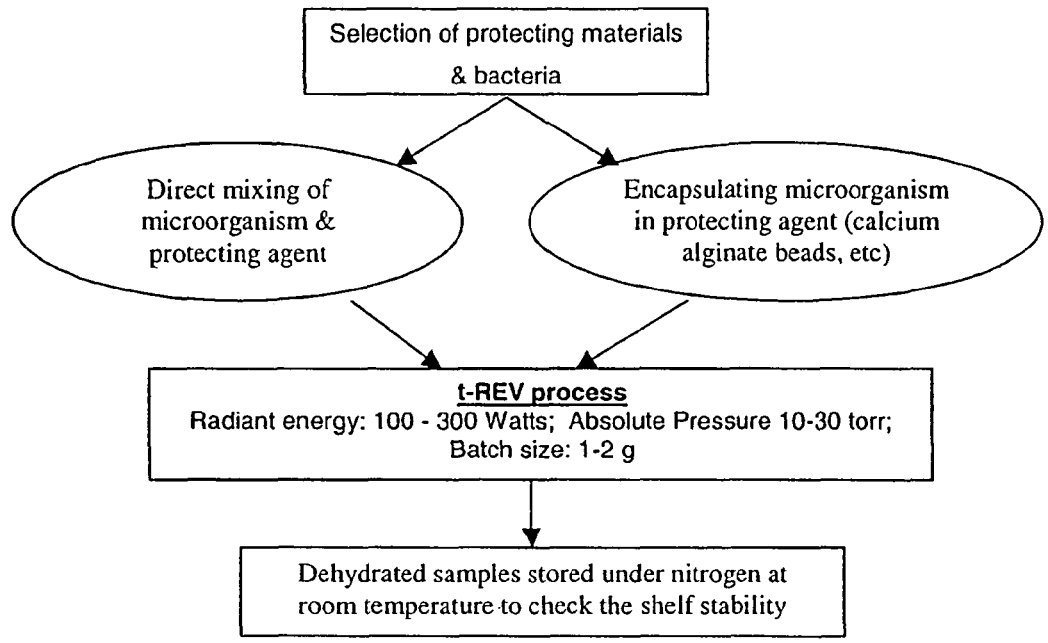
FIG. 31 is a schematic representation of a t-REV process for dehydration of microorganisms such as bacterial cultures, live attenuated microbes, probiotics, yeasts, etc.

FIG. 31 shows a schematic representation of the t-REV process for dehydration.

Freezing and Freeze-Drying.

Figure 32:
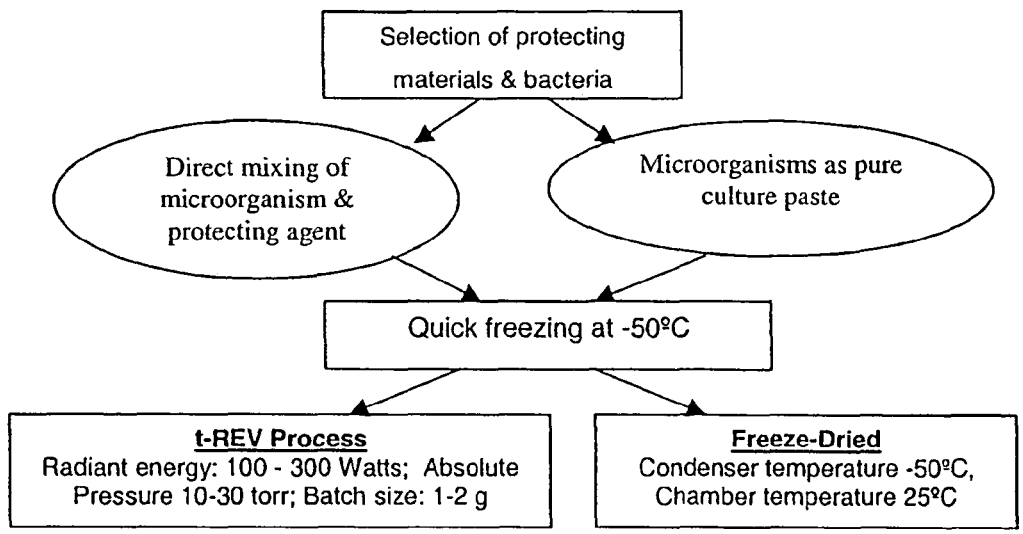
FIG. 32 is a schematic representation of t-REV freezing and freeze-drying processes for dehydrating frozen microorganisms such as bacterial cultures, live attenuated microbes, probiotics, yeasts, etc.

A part of samples were quick frozen at −50° C. then either dried with freeze drier (condenser temperature −50° C., chamber temperature 25° C., drying time 72 hours) or with the t-REV process, as outlined in FIG. 32.

t-REV Process.

Bacterial or yeast cells, in pure form or mixed with protecting agent were dried under microwave radiation under vacuum (Model # VMD 900 W, Enwave Corporation Vancouver, BC, Canada), using three different power levels 100, 200 and 300 watts for 15 and 30 minutes under 10 and 30 torr vacuum.

Survival of Dehydrated Bacterial Cells.

All dried samples were reconstituted with sterilized 0.1% (w/v) peptone water to their initial weight. Serial dilutions were made and spread-plated on MRS-agar and YPD-agar for bacteria and yeast respectively. Colonies on MRS plates were counted after 48 hours of anaerobic incubation at 37° C. Colonies on YPD-agar plates were enumerated after 24 hours at 30° C. The number of surviving bacteria was reported as CFU/g solid.

Water Activity Determination.

The water activity of the samples before microwave vacuum drying, immediately after drying and during storage was measured (Aqualab R Model series 3, Decagon Devices, Inc., Washington, USA).

Shelf Life Study.

Dehydrated bacterial samples were collected in sterile, nitrogen filled glass vials, sealed and stored at room temperature for a period of 6 weeks. Numbers of viable cells were determined every two weeks during the storage time.

Example 20

*Lactobacillus salivarius* 417

*Lactobacillus salivarius* 417 was used as pure culture or along with 10% Lactose, 10, 15 and 25% Skim milk powder (SMP) in REV processes at two different drying condition (300 W, 30 torr) and (200 W, 10 torr) as described according to Example 19. Results are shown below in Table 3.

TABLE 3

*Lactobacillus salivarius* 417 log reduction after REV process

| Treatment | | vacuum (Torr) | Drying temperature | aw | Log reduction |
|---|---|---|---|---|---|
| L. salivarius | 10% SMP | 30 | | 0.47 ± 0.01 | 1.0 ± 0.18 |
| L. salivarius | 15% SMP | 30 | 33.3 ± 4.04 | 0.45 ± 0.01 | 0.63 ± 0.18 |
| L. salivarius | 25% SMP | 30 | | 0.52 | 1.38 |
| L. salivarius | 10% SMP | 10 | 24.7 ± 2.9 | 0.37 ± 0.01 | 0.54 ± 0.14 |
| L. salivarius | Pure culture | 10 | 33 | 0.35 | 0.74 |
| L. salivarius (frozen + REV) | 10% SMP | 30 | 38.0 ± 4.2 | 0.41 ± 0.01 | 0.51 ± 0.01 |

TABLE 4

Log reduction in freeze dried samples as pure and with various protecting agents

| Strain | Treatment | aw | Log reduction |
|---|---|---|---|
| L. S (417) | Pure culture | 0.3 | 0.78 |
| L. S (417) | 10% lactose | 0.37 | 0.99 |
| L. S (417) | 10% SMP | 0.32 ± 0.01 | 0.77 ± 0.26 |

TABLE 5

Bacterial population during storage at 25° C. over 6 weeks

| Strain | Drying method | aw | 0 week cfu/g | 2 Weeks cfu/g | 4 weeks cfu/g | 6 weeks cfu/g |
|---|---|---|---|---|---|---|
| L.S (417) | REV | 0.34 | 3.995 × 10$^9$ | 5.389 × 10$^7$ | 2.716 × 10$^7$ | 1.321 × 10$^7$ |
| L.S (417) | Freeze dried | 0.33 | 2.483 × 10$^9$ | 1.057 × 10$^8$ | 4.113 × 10$^7$ | 1.057 × 10$^7$ |

*L.S: *Lactobacillus salivarius*

Example 21

Lactobacillus brevis

*Lactobacillus brevis* (104) was used as pure culture or mixed with 15% skim milk powder in REV process (300 W, 30 torr) as described according to Example 19. Results are shown below in Table 6.

TABLE 6

*Lactobacillus brevis* (104) log reduction after REV process with 10% skim milk powder

| Treatment | vacuum (Torr) | Drying temperature | aw | Log reduction |
|---|---|---|---|---|
| L. brevis (104) 10% SMP | 30 | 36.0 ± 3.6 | 0.34 ± 0.01 | 1.02 ± 0.11 |

Example 22

Bifidobacterium longum

*Bifidobacterium longum* was t-REV dehydrated mixed with 10% Skim milk powder in REV process (200 W, 10 torr) as described above in Example 19. Results are shown below in Table 7.

TABLE 7

*Bifidobacterium longum* log reduction after REV process with 10% skim milk powder

| | Treatment | vacuum (Torr) | Drying temperature | aw | Log reduction |
|---|---|---|---|---|---|
| Bifidobacterium longum | 10% SMP | 10 | 23.5 ± 0.7 | 0.36 ± 0.01 | 0.35 ± 0.19 |

Example 23

Saccharomyces cerevisiae

*Saccharomyces cerevisiae* was used as pure or mixed with 10% trehalose, 20% honey in REV process (300 W, 30 torr) as described above in Example 19. Results are shown below in Table 8.

TABLE 8

*Saccharomyces cerevisiae* log reduction due to REV with various protecting material

| | treatment | vacuum (Torr) | Drying temperature | Aw | Log reduction |
|---|---|---|---|---|---|
| S. cerevisiae | pure culture | 30 | 32.5 ± 2.1 | 0.41 ± 0.03 | 3.64 ± 2.47 |
| S. cerevisiae | 10% trehalose | 30 | 44 | 0.46 | 3.30 |
| S. cerevisiae | 20% Honey | 30 | 38 | 0.40 | 2.70 |

Examples 19-23

Results & Discussion

When microorganisms t-REV dried under 30 torr absolute pressure and 300 W microwave power, maximum log reductions of 1.5 and 3.6 was found for bacterial and yeast cultures respectively. Drying bacteria in lower absolute pressure of around 10 torr with maximum drying temperature of 23° C. increased the number of surviving cells (FIG. 3). The least reduction in bacterial counts occurred with cultures dried at lower pressure, such as was observed for *Bifidobacterium longum* with a $\log_{10}$ reduction value of 0.35. The values obtained from log reduction of microorganisms after freeze-drying and t-REV process at low absolute pressures are similar. It should be noted that bacteria frozen prior to t-REV showed higher survival after t-REV process than freeze dried bacteria. Our shelf life study also showed that survival of t-REV dried bacteria after six weeks of storage was equivalent to that of bacteria freeze-dried to the same water activity.

One of the advantages of the t-REV method compared to the freeze-drying method is that t-REV samples do not need to go through a freezing step before dehydration, which not only reduces the cost but also increases the speed of process. At the same time, in situations where bacterial culture needs to be frozen for purposes of shipment or storage etc, they still can go through the t-REV process without difficulty.

In general these examples demonstrate that viability of microorganisms dehydrated by t-REV was equivalent or superior to that dehydrated by freeze drying. Further more, t-REV is much faster (e.g. 20 minutes as compared to 72 hours) and less energy intensive (e.g. less than 50% of the energy consumption) than freeze drying. Materials to be dried by t-REV may be frozen or not while materials intended for freeze drying must be frozen. Various protective agents, especially materials containing simple sugars and disaccharides such as skim milk powder, honey and trehalose were shown to improve viability of microorganisms during t-REV processes.

The mechanisms of protection of viability and bioactivity differ somewhat between freeze drying and t-REV as demonstrated by the fact that glycerol, a common freeze drying protectant is totally ineffective in t-REV drying applications. This is because glycerol is a non-volatile liquid which itself heats readily in a microwave field. Even after the moisture is evaporated, glycerol will continue to heat in the microwave field and thus heat the dry organism to destructive temperatures. On the other hand, correctly selected protective agents such as trehalose, lactose, and the fructose, glucose and sucrose that make up honey, do not generate enough heat when dry to cause heating of the organisms.

Figure 33:
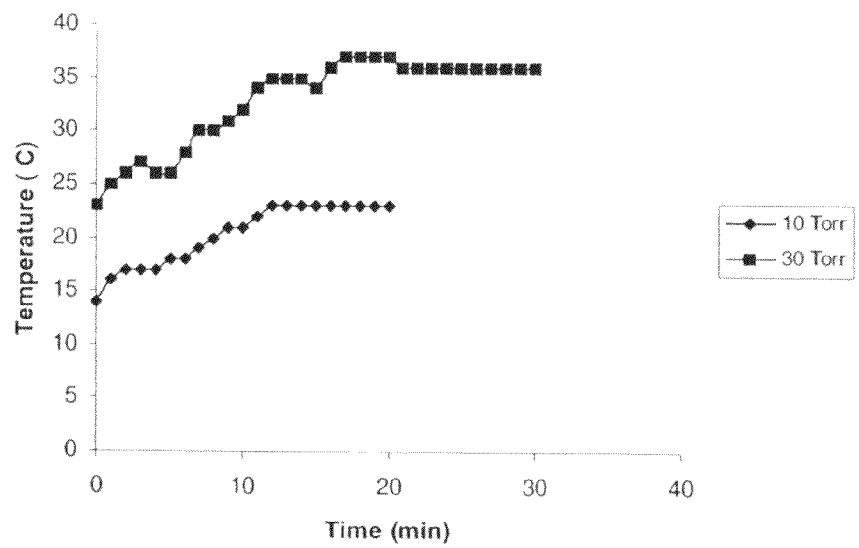
FIG. 33 shows a temperature profile of *Lactobacillus salivarius* during t-REV dehydration at 10 and 30 torr vacuum.
Figure 34:
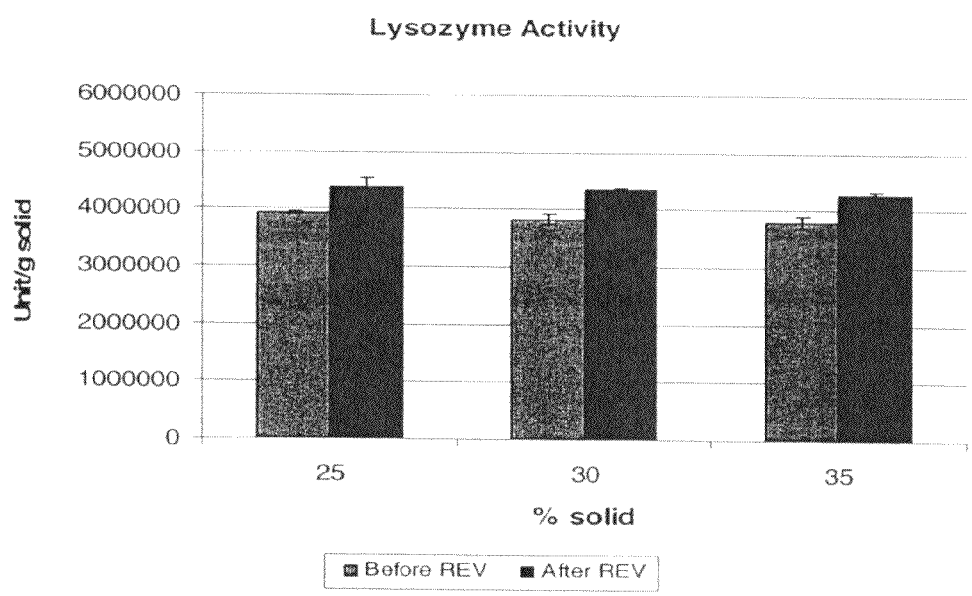
FIG. 34 shows lysozyme enzymatic activity before and after t-REV.
Figure 35:
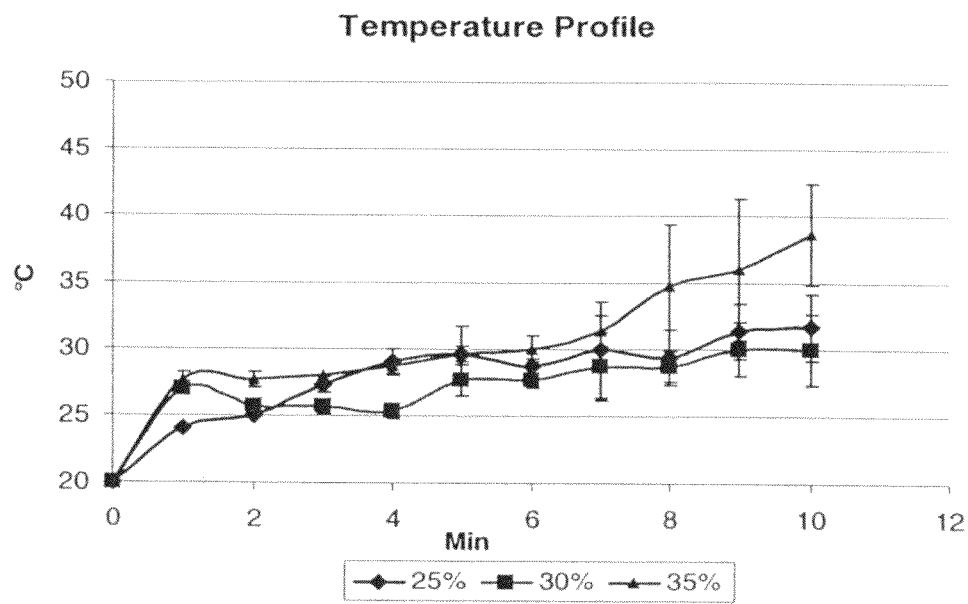
FIG. 35 shows a temperature profile of chitosan-lysozyme mixtures during the REV process.

FIG. 33 illustrates the temperature profile of *Lactobacillus salivarius* during REV dehydration at 10 and 30 torr vacuum. At both 10 Torr and 30 Torr, it can be seen that acceptable temperature control can be accomplished.

Example 24

Enzyme Dehydration

Lysozyme

Lysozyme extracted from chicken egg-white has been shown to be effective for prevention of necrotic enteritis in chicken flocks, as a safer alternative to antibiotics. The causative agent of necrotic enteritis in chickens is the bacteria *Clostridium perfringens*. One practical problem encountered in the administration of lysozyme antimicrobial blend through feed is the deactivation of lysozyme during the pelleting process at 195° F. Naturally part of lysozyme would deteriorate during this heating process. More than 50% loss of unprotected lysozyme after the feed pelleting process has been reported. Microencapsulation protects lysozyme from heat denaturation during feed pelleting and also pepsin digestion in the bird's digestive tract. An increase in lysozyme protection (up to 75% retention) during pelleting can occur when lysozyme is encapsulated with hydrogenated vegetable oil and calcium stearate. Chicken lysozyme is a biologically active agent which is suitable for inclusion in t-REV dehydrated hydrocolloid foams, as a means of encapsulating and protecting the lysozyme. Since lysozyme and chitosan were found to have synergistic antimicrobial effects against *Cl. perfringens* type A and *E. coli* F4 strains, chitosan was chosen in this example as the hydrocolloid which may be t-REV dehydrated together with lysozyme in order to provide a protective matrix for the lysozyme.

Lysozyme-Chitosan Mixture.

Materials and methods. Water-soluble chitosan (also called chito-oligosaccharides) was chosen to be the first hydrocolloid for the lysozyme t-REV study. Chitosan has anti-clostridial effects and when combined with lysozyme, produced synergistic efficacy against *Cl. perfringens*. An optimal ratio of lysozyme/chitosan mixture was determined as 1:3 in a fractional inhibitory concentration study (results not shown).

Lysozyme (Neova Technologies Inc. Lot#: LA5392) and chitosan (Shanghai Freemen Chemicals Co., Ltd. MW ca. 15 KDa) were tested for moisture content using the vacuum oven method (100° C. for 5 hours). The lysozyme and chitosan mixture at the 1:3 solid ratio was blended with water using a Braun hand mixer chopper attachment at 10,000 rpm for 3-5 min to yield a paste with homogeneous consistency. A number of pastes were made with the following total solids content levels: 25%, 30%, 35%, 40% and 45%. Triplicate samples were made and kept in Whirlpak bags. The pastes were tested for actual solid content, lysozyme enzymatic activity and water activity before subjecting to the t-REV process.

t-REV Process.

About 4 g of the paste were weighed into a clean and dry cylindrical quartz container. The paste sample was pressed to the bottom of the container with a spatula to avoid splashing inside the chamber of the experimental t-REV dehydrator. Three samples from each paste were loaded to the plastic sample holder and dried by t-REV in a prototype t-REV dehydrator (Model # VMD 900 W, Enwave Corporation Vancouver, BC, Canada), using 300 Watts microwave power and absolute chamber pressure of 30 Torr for 10 min. The temperature profile during the process was monitored using an infrared thermometer. After the process, the samples were weighed immediately and the water activity was also tested. After the water activity testing, the samples were packaged in Whirlpak™ bags under nitrogen at a relative humidity of 18% in a glove box to minimize moisture change. Before the moisture and lysozyme activity testing, the samples were finely ground using a mortar and pestle and the rest of the samples were stored in serum vials, with headspace flushed with nitrogen or helium gas.

Evaluation of Final Product

Cross Sectional Structure.

The dried materials were first observed under a stereo-viewer (Motic) at 500× magnification for their microstructural differences. In general, products with lower initial solid contents had a more porous structure and larger pore size.

Solubility.

The materials were then ground to fine powder (>100 mesh) using a pestle and mortar. Fifty mg of sample was weighed into a test tube and 5 ml of distilled water was added. The tube was vortexed briefly to test solubility. The blend dissolved as well as the original lysozyme and chitosan powders.

Lysozyme Activity.

Lysozyme activity was determined by the turbidity assay method using freeze-dried *Micrococcus luteus* cell wall suspension. Lysozyme retained its activity after the drying process.

Results and Discussion.

In general, the lower initial solids content samples gave a more porous structure by visual comparison and also according to the data generated by high pressure mercury porosimetry. The 40% and 45% pastes were very hard and did not produce very porous structures after t-REV. Therefore, only the 25%, 30% and 35% samples were subjected to further study. The tested solid levels of the paste were very close to the target percentage. They were 24.47%, 29.35% and 34.67%, respectively. The initial water activity was around 0.99 for all of the samples at room temperature and the dried samples had water activity ≤0.40. The calculated moisture contents of the dried samples (based on the weight loss and tested solid contents) were consistently lower than the tested moisture levels of the finely ground powder, indicating rapid moisture ingress in the dried products. The final moisture contents on all of the samples stabilized at about 15%.

FIG. 34 shows lysozyme enzymatic activity before and after t-REV, illustrating that no enzymatic activity loss was found of lysozyme for all of the samples after the t-REV process. On the contrary, there was a consistent increase (about 10%) in lysozyme activity based on the enzymatic activity assay. There are reports on the formation of dames and higher order polymers and improved activity when lysozyme was heated at 70-80° C. (unpublished data).

FIG. 35 shows a temperature profile of chitosan-lysozyme mixtures during the t-REV process. In this process, the temperature of the samples were at all times less than 40° C. Importantly, no loss of biological activity was detected with t-REV dehydration.

Example 25

Drug Dehydration

Penicillin

Materials and Methods.

Hydrogel Preparation.

High methoxy pectin (4% w/w) (Gum Technology Corp., Tucson, Ariz.), corn starch (3% w/w) (Famous food, Vancouver, Canada), sodium alginate (3% w/w) (Sigma), and glycerol (0.5% w/w) (Pure Standard Product, Winnipeg, Canada) as plasticizer, was mixed with water (90% w/w) using a hand mixer until a homogenous batter was formed. Then 0, 5 or 10 ml stock solution of 200 mg/ml penicillin was added to homogenous batter, to make hydrogels containing 0,100 and 200 mg penicillin G/g dry weight. The amount of water was adjusted in a way that the final water content did not exceed (90% w/w) in final fresh batter mix. The batter was poured into Teflon™ molds (32 mm diameter, 11.2 mm deep) and quick-frozen at −80° C. for 4-5 hours. A similar hydrogel with no penicillin was used as a control.

Frozen batter was then immersed in two liters calcium chloride solution (3% w/v) (Fisher Scientific, Ottawa, Canada) for 16-18 hours at room temperature. During the immersion time, thawing of the frozen molded batters and cross linking between the calcium chloride and sodium alginate took place simultaneously and resulted in a stable gel with soft solid structure. After completing the gelling process the individual hydrocolloid gels were removed from the calcium chloride solution and surface water was removed using paper towel.

Dehydration of Hydrogel.

Hydrogels were dried with microwave radiation under vacuum (t-REV) (VMD 900W, Enwave Corporation, Vancouver, BC). The drying condition was 300 W microwave power, 30 Torr absolute pressure inside the chamber for 20-30 minutes. The temperature of the materials was monitored during dehydration using an infrared thermometer and did not exceed 45° C. All dried samples were packed into Whirl-Pak™ (Nasco Whirl-Pak, USA) sterile plastic bags and stored at room temperature up to three months before analysis.

In Vitro Drug Release.

The release of penicillin from dehydrated hydrogels was measured in vitro. 1.05±0.12 g of dehydrated hydrogels were soaked in 50 ml filter-sterilized phosphate-citric acid buffer (pH=7). Soaking samples were incubated in a shaking incubator at 75 rpm and 25° C. Every 24 hours a sample of release medium was withdrawn and assayed for penicillin content and activity. This experiment was performed in triplicate.

Penicillin Concentration.

The concentration of Penicillin G in release medium was assayed using a Shimadzu RF-540 spectrofluorometer. The intensity of the fluorescence in samples was recorded in a 1 cm path length cuvette ($\lambda_{ex}$ 280 nm; $\lambda_{em}$ 560 nm, slit 5 nm both for emission and excitation). The concentration of penicillin G was calculated compared to standard calibration curve. All assays were conducted in duplicate.

Disc Assay (Penicillin Activity Detection).

A spore suspension of *Bacillus stearothermophilus* var. *calidolactis* C953 (Merck, Germany) was added to D.S.T. Agar (Oxoid CM 0261, England) to a concentration of $10^7$ to $10^8$ CFU/ml., then distributed into sterile petri dishes (90 mm diameter), 8-10 ml each and stored at 4° C. up to one month until used in an assay. To run the assay, plates were pre-incubated at 65° C. for 3 hours. Then paper discs (Whatman 1, 12 mm diameter) were soaked with 100 µl of penicillin-containing sample and placed on the surface of the agar, at a distance of 10 mm from the edge of the plate. The diameter of clear zones around the paper discs were measured by ruler after 45 minutes incubation at 65° C. Each sample was tested in triplicates.

Determination of Penicillin Decomposition Rate.

To allow for correction by calculation for the amount of penicillin loss over the time of experiments, the decomposition rate of penicillin in each condition was determined. One or 1.5 ml penicillin (200 mg/ml) was added to 50 ml filter sterile phosphate citric buffer and incubated at 25. The concentration of penicillin in solution was measured at time of zero and every 24 hours for five consecutive days. The experiment was performed in triplicates and the average concentration of penicillin was used for the calculation of the degradation rate.

The values of log C were plotted versus time, where C was the concentration of penicillin G after time t. The values for decomposition rate were obtained from the negative reverse of the slope. These values showed the time needed in each condition for the concentration of penicillin to reach to 10% of its original concentration.

Pore Size and Pore Size Distribution.

Total pore volume and pore size distribution in t-REV dehydrated hydrogels with different concentrations of penicillin were measured. Mercury injection capillary pressure measurements were performed in triplicate using a mercury porosimeter (Micromeritics AutoPore III, Folio Instruments Inc., ON, Canada), according to the manufacturers recommended procedures.

Scanning Electron Microscopy.

Scanning electron microscopy was used to observe microstructural differences among dehydrated hydrogels. First the surfaces of samples were observed with no coating under SEM (Hitachi S4700, SEM). Then hydrogels were freeze-fractured in liquid nitrogen, sputter-coated with 3 nm gold and again subjected to SEM.

Extent of Maximum Water Uptake (Water Absorption Capacity).

Triplicate samples of each hydrogel were weighed and placed in Erlenmeyer flasks containing 50 ml distilled water, and incubated at 25° C. in a shaking incubator (75 rpm) until maximum weight was reached (about 24 hours), as determined by removing the hydrogels carefully at time intervals, removing excess water with filter paper and subsequently weighing them. The water absorption capacity of each sample was calculated using the following equation:

$$\text{water absorption}(\%) = \frac{(\text{weight at time }(t) - \text{initial weight}) \times 100}{\text{initial weight} \times 100} \quad \text{Eq. (2)}$$

Results & Discussion.

To check the amount of penicillin loss to leaching during gel preparation, calcium chloride solutions were analyzed for penicillin. The amount of penicillin lost during gel preparation was 22.2 mg for hydrogels containing 100 mg/g hydrogels and 75.4 mg, for 200 mg/g hydrogels, respectively. Control samples, fresh calcium chloride solution and fresh buffer did not show any traces of penicillin in the disc assay for penicillin detection.

When hydrogels were soaked in phosphate-citric buffer at room temperature, the release of penicillin over time increased and reached to maximum after 120 hours, in which time the release of penicillin from 100 mg and 200 mg dried hydrogels was virtually 100%.

Figure 36:
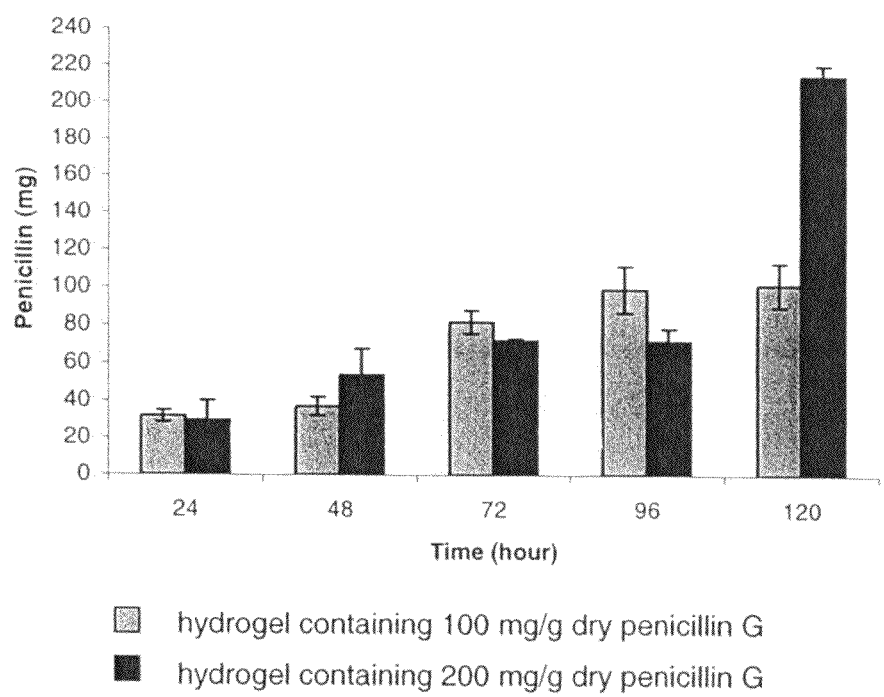
FIG. 36 shows penicillin release in phosphate-citric buffer at 25° C. over time for hydrogels containing either 100 or 200 mg/g dry penicillin G.

FIG. 36 shows penicillin release in phosphate-citric buffer at 25° C. over time for a hydrogel containing either 100 or 200 mg/g dry penicillin G. In 120 hr all hydrogel samples were completely dissociated or dissolved in phosphate buffer.

Figure 37:
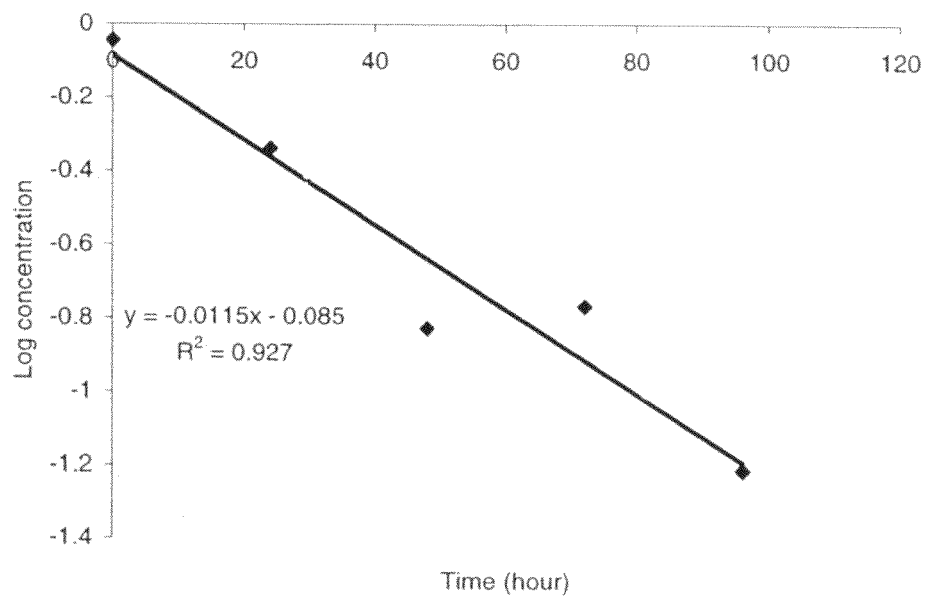
FIG. 37 shows a penicillin decomposition curve in phosphate buffer at 25° C.

FIG. 37 shows a penicillin decomposition curve in phosphate buffer at 25° C.

Table 9 illustrates that there was no significant difference between surface structure of hydrogel samples containing penicillin (100 or 200 mg per g dry matter) and control in porosity (p<0.05). The structure of the surface of the hydrogels formed was examined by SEM, and porosity and pore size distribution was evaluated. The highest porosity was measure for dehydrated hydrogels containing 200 mg penicillin G with a value of 84.5%.

TABLE 9

Total porosity and pore size distribution of dehydrated hydrogels containing 0, 100 and 200 mg penicillin G potassium salt

| | | Dehydrated hydrogels | | |
|---|---|---|---|---|
| | | Control | 100 mg/g penicillin G | 200 mg/g penicillin G |
| TOTAL POROSITY (%) | | 81.2 ± 6.7 | 81.7 ± 3.0 | 84.5 ± 0.6 |
| Pore size distribution (%) | <10 (μ) | 24.75 ± 3.2 | 26.95 ± 9.1 | 22.9 ± 2.8 |
| | 10-20 (μ) | 5.75 ± 0.4 | 4.0 ± 0.0 | 6.25 ± 2.5 |
| | 20-50 (μ) | 16.75 ± 3.2 | 17.55 ± 3.6 | 13.8 ± 1.8 |
| | 50-100 (μ) | 13.75 ± 1.8 | 17.0 ± 1.4 | 19.8 ± 6.6 |
| | 100-500 (μ) | 39.0 ± 4.2 | 34.5 ± 11.3 | 37.25 ± 3.2 |

Figure 38:
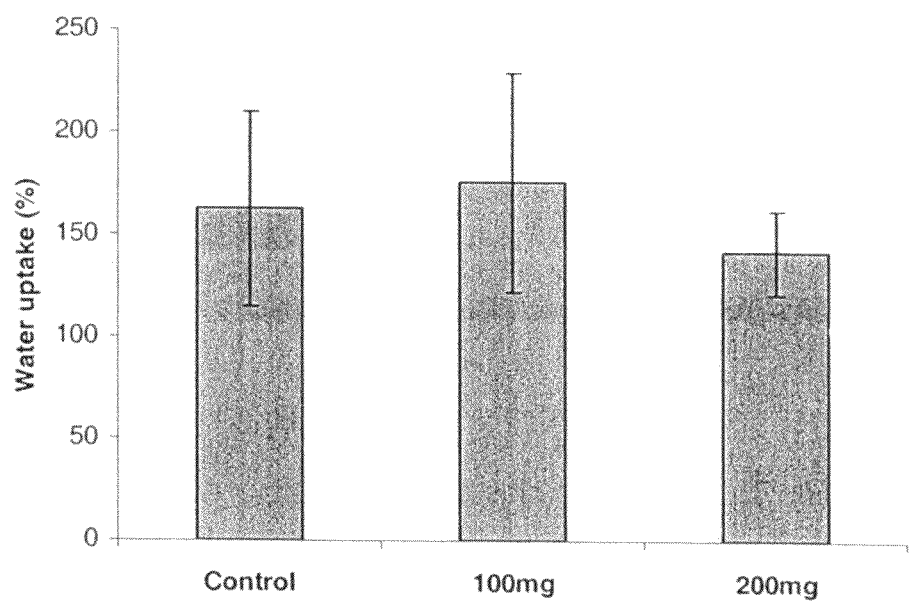
FIG. 38 shows water sorption capacity of dehydrated hydrogels with 0, 100 mg and 200 mg penicillin G per g dry matter.

FIG. 38 demonstrates that there was no significant difference for water sorption capacity of dehydrated hydrogels ($p<0.05$).

Conclusions.

Hydrogels containing antibiotics were dehydrated by t-REV without loss of activity. Furthermore, the antibiotic demonstrated a gradual controlled release over a period of 120 hours. Inclusion of penicillin in hydrogels did not significantly affect the porosity water absorption or surface properties of t-REV dehydrated hydrogels.

Example 26

Exemplary Device for Inducing Travelling Wave Radiant Energy Under Vacuum (t-REV)

Any device capable of directing radiant energy in a generally unidirectional route through a sample can be used to induce travelling wave radiant energy through a sample according to the invention.

Figure 39:
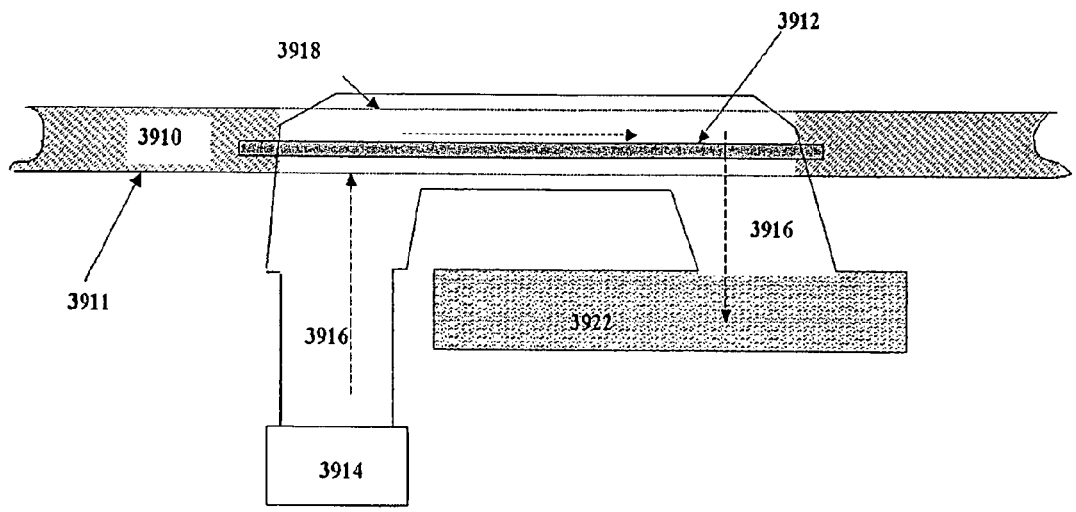
FIG. 39 is a schematic diagram of an exemplary apparatus for inducing traveling wave radiant energy under vacuum (t-REV).

FIG. 39 is a schematic diagram depicting an exemplary apparatus for inducing traveling wave radiation energy under vacuum (t-REV) through a sample. Dashed arrows show the path of microwaves which pass through the sample. A vacuum chamber 3910 comprises a metal tube 3911 and quartz tube 3918 into and out of which radiant energy is directed via a wave guide 3916. A sample holder 3912 is housed within the lumen of the quartz tube, and a water load 3922 is found at or near the terminal end of the quartz tube, to absorb radiant energy after passing through the sample. A microwave generator 3914 is disposed upstream of the waveguide 3916, so as to provide radian energy to be directed through the sample.

Figure 40:
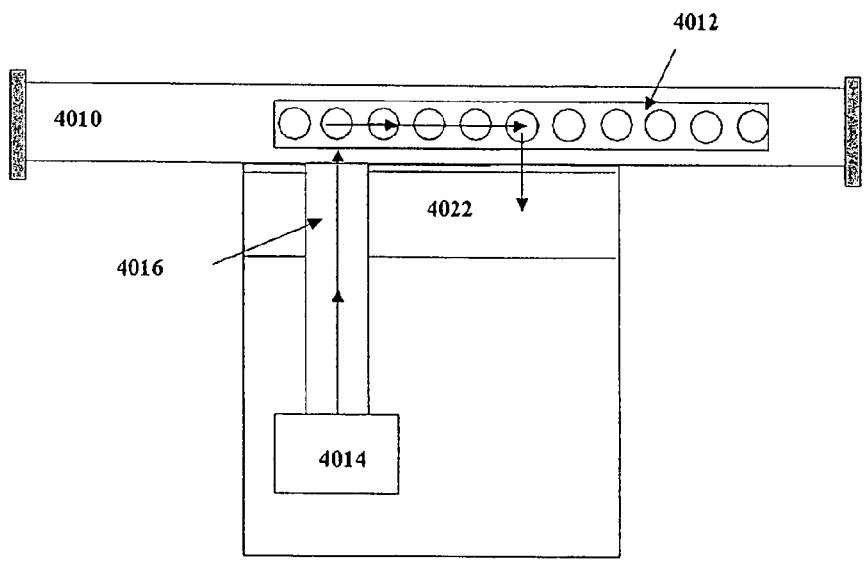
FIG. 40 is a schematic diagram of a further exemplary apparatus for inducing traveling wave radiant energy under vacuum (t-REV).

FIG. 40 depicts a similar exemplary apparatus. Radiant energy source 4014 generates and emits microwaves through waveguide 4016 into a vacuum chamber 4110. Sample holder 4012 is disposed within the lumen of the vacuum chamber. Water reservoir 4022 is disposed near the downstream end of the chamber, and is disposed here to absorb microwaved after passing through the sample.

Figure 41:
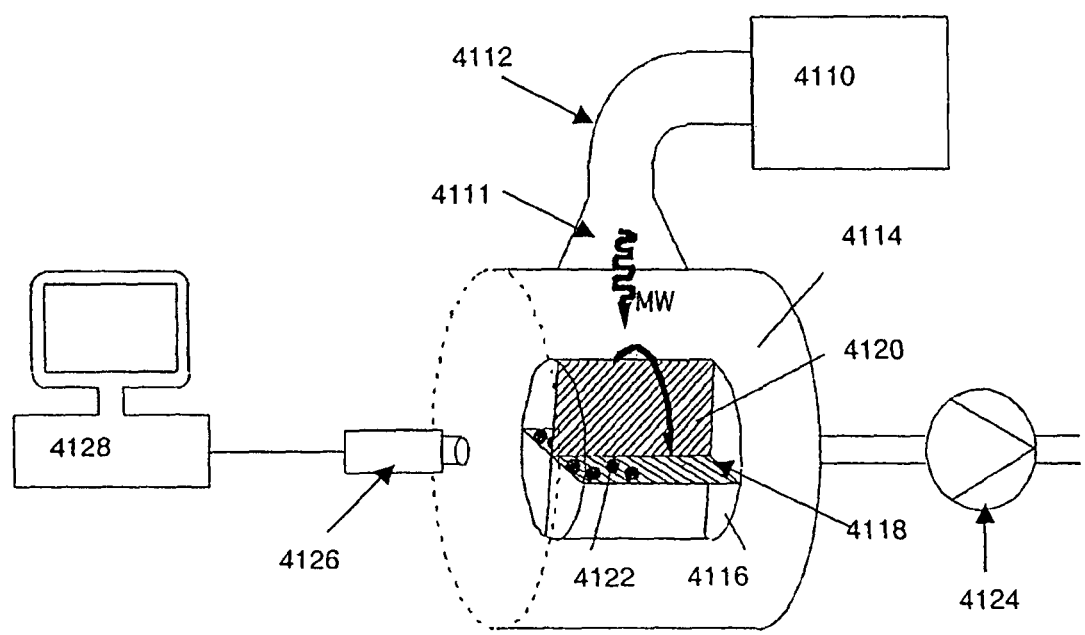
FIG. 41 illustrates a typical resonance chamber for induction of radiant energy under vacuum (REV).

FIG. 41, by way of comparison with FIG. 39 and FIG. 40, shows a schematic representation of a resonance chamber that could be used for inducing radiant energy under vacuum (REV), having deflection and reflection of microwaves within the chamber. This arrangement differs from the present invention in that the incoming radiant energy moves through the samples in a multiplicity of different directions, and is not quenched after having passed through the sample. A microwave generator (4110) induces microwaves (4111) via a wave guide (4112) into a resonance chamber (4114). A drum (4116) disposed within the chamber comprises supports (4118) and dividers 4120) on which samples of biomaterial (4122) are placed. A vacuum pump (4124) is used to create the desired vacuum conditions within the chamber (4114). A camera (4126) is located outside of the chamber, but able to observe the state of the samples of biomaterial within the chamber. A data recorder (4128) is in communication with the camera to monitor the samples of biomaterial for desired properties. While this arrangement beneficially allows for monitoring of the state of the samples of biomaterial, the microwaves once induced into the chamber, may deflect and reflect off the sides of the chamber, the drum, the dividers, or the supports, thereby rendering temperature control and process control more challenging than with t-REV processes.

The above-described embodiments of the present invention are intended to be examples only. Alterations, modifications and variations may be effected to the particular embodiments by those of skill in the art without departing from the scope of the invention, which is defined solely by the claims appended hereto. All documents referred to herein are incorporated by reference.

REFERENCES

Durance et al, T. D., Ressing, M. and Sundaram, J. 2005. Method for producing hydrocolloid sponges and foams. PCT/CA2005/001192.

Eichler S, O. Pamon, I. Ladyzhinski, Y. Cohen and S. Mizrahi. 1997. Food research International. 30: 719-726.

Gardiner, et al. (2000) *Appl Environ Microbiol* 66, 2605-2612.

Kietzke et al. 2003. Natural Materials, 2: 408-412.

Kim H O, Durance T D, Scaman C H, Kitts D D. 2000. J. of Agric. and Food Chemistry 48: 4182-4186.

Lin T M, Durance T D, Scaman C H. 1998. Food Research International Vol. 31 (2): 111-117.

Manson K H, Wyand M S, Miller C and Neurath A R. 2000. Antimicrobial Agents and Chemotherapy. Vol 44 (11): 3199-3202.

Metaxas A C, Meredith R J. 1983. Industrial microwave heating. 1st ed. Peter Peregrinus Ltd. London. UK.

Neurath A R, Strick N and Li Y Y. 2002. BMC Infect Dis. 2:27.

Neurath A R, Strick N, and Li Y Y. 2003. BMC Infect Dis. 3:27.

Rassis. D, A. Nussinovitch and I. S. Saguy. 1997. International Journal of Food Science and Technology. 32: 271-278.

Nussinovitch et al. 1998. Food Hydrocolloids. 12: 105-110.

Rassis. D, I. S. Saguy and A. Nussinovitch. 1998. Journal of Agriculture and Food Chemistry. 46: 2981-2987.

Scaman, C. H. and Durance, T. D. 2005. Combined microwave vacuum drying. Chapter 19 IN "Emerging Technologies for Food Processing." p.p. 507-530. Elsevier: London.

Yousif A N, Durance T D, Scaman C H, Girard B. 2000. J. of Food Science Vol 65 (6): 926-930.

What is claimed is:

1. A method for drying a biologically active material comprising the steps of: combining the biologically active material and a protecting agent in an aqueous solvent to form a paste; and exposing the paste to travelling wave radiant energy under vacuum in the presence of a water load, to boil the solvent from the paste;

wherein the travelling wave radiant energy is provided in a waveguide using uni-directional waves in a travelling wave applicator, and wherein the paste is disposed in the waveguide between a microwave generator of the travelling wave applicator and the water load, for the water load to quench radiant energy passing through the paste.

2. The method according to claim 1 wherein the protecting agent is selected from the group consisting of: cellulose acetate phthalate (CAP), carboxy-methyl-cellulose, pectin, sodium alginate, glycerol, hydroxyl propyl methyl cellulose (HPMC), methyl cellulose, carrageenan, gum acacia, xanthan gum, locust bean gum, isolated soya protein, chitosan, maltodextrin, collagen, salts of alginic acid, polyglycolic acid, starches, gelatin, skim milk powder, sugars, and combinations thereof.

3. The method according to claim 1 wherein the solvent is distilled water.

4. The method according to claim 1 wherein the aqueous solvent additionally comprises an additive selected from the group consisting of coconut oil, corn oil, peanut oil, hydrogenated vegetable oil, olive oil, mineral oil, and combinations thereof.

5. The method according to claim 1 wherein a surfactant is added to the aqueous solvent.

6. The method according to claim 5 wherein the surfactant is selected from the group consisting of glycerol, propylene glycol, lecithin, Tween-80, Tween-20, wax, and combinations thereof.

7. The method according to claim 1 additionally comprising the step of cutting the paste to a desired shape.

8. The method according to claim 1 additionally comprising the step of freezing the paste.

9. The method according to claim 1 wherein the radiant energy under vacuum is provided in a chamber having pressure maintained between 10 and 760 mmHg.

10. The method according to claim 1 wherein the radiant energy under vacuum is provided at a level of from 100 to 5000 Watts per kilogram of initial mass of paste.

11. The method according to claim 1 wherein travelling wave radiant energy is provided using microwave power.

12. The method according to claim 1 wherein the travelling wave radiant energy is provided using a wavelength ranging from 1 cm to 10 meters.

13. The method according to claim 1 wherein the protecting agent is selected from the group consisting of: a mixture of pectin and gelatin; a mixture of pectin, CAP, and methylcellulose; a mixture of pectin and methylcellulose; a mixture of HPMC of 4,000 cP and HPMC of 400 cP; a mixture of locust bean gum, pectin, methylcellulose, and tapioca starch; a mixture of sodium alginate, pectin, carrageenan, and methylcellulose; and a mixture of gelatin, low methoxy pectin, and corn starch.

14. The method according to claim 1 wherein the biologically active material comprises a cell, a microbe, a culture, a probiotic, a yeast, a protein, an enzyme, a vaccine, a drug, a microbicide, a fungicide, a vitamin, a mineral, or a spermicide.

15. The method according to claim 1 wherein the protecting agent when combined with the aqueous solvent results in a Young's modulus value of from 0.16 kPa to 3000 kPa.

16. The method according to claim 1 wherein the travelling wave radiant energy under vacuum is applied to yield a foam having an average pore size ranging from 0.003 to 500 microns.

17. The method according to claim 16 wherein the travelling wave radiant energy under vacuum is applied so that the foam has a water activity of less than 0.85.

* * * * *